US012513447B2

(12) United States Patent
Cheong et al.

(10) Patent No.: US 12,513,447 B2
(45) Date of Patent: Dec. 30, 2025

(54) ELECTRONIC DEVICE FOR PROCESSING AUDIO DATA AND OPERATION METHOD THEREFOR

(71) Applicant: SAMSUNG ELECTRONICS CO., LTD., Suwon-si (KR)

(72) Inventors: Gupil Cheong, Suwon-si (KR); Doosuk Kang, Suwon-si (KR); Seongbok Kim, Suwon-si (KR); Jinho Kim, Suwon-si (KR); Bokun Choi, Suwon-si (KR); Sungjun Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 253 days.

(21) Appl. No.: 18/337,987

(22) Filed: Jun. 20, 2023

(65) Prior Publication Data
US 2023/0336904 A1    Oct. 19, 2023

Related U.S. Application Data

(63) Continuation of application No. PCT/KR2022/000568, filed on Jan. 12, 2022.

(30) Foreign Application Priority Data

Jan. 12, 2021  (KR) .................. 10-2021-0003782
Dec. 1, 2021   (WO) .............. PCT/KR2021/017980
Jan. 11, 2022  (KR) .................. 10-2022-0003829

(51) Int. Cl.
  *H04R 1/10*    (2006.01)
  *H04R 5/04*    (2006.01)
(52) U.S. Cl.
  CPC ............. *H04R 1/1041* (2013.01); *H04R 5/04* (2013.01); *H04R 2420/07* (2013.01)

(58) Field of Classification Search
  CPC ..... H04R 1/1041; H04R 5/04; H04R 2420/07
  (Continued)

(56) References Cited

U.S. PATENT DOCUMENTS 10,558,427 B2 *  2/2020  Jo ......................... G06F 3/165
10,588,167 B1    3/2020  Chen
(Continued)

FOREIGN PATENT DOCUMENTS

KR    20080023479 A    3/2008
KR    20170067050 A    6/2017
(Continued)

OTHER PUBLICATIONS

International Search Report for PCT/KR2022/000568 mailed Apr. 19, 2022, 5 pages.
(Continued)

*Primary Examiner* — David L Ton
(74) *Attorney, Agent, or Firm* — NIXON & VANDERHYE P.C.

(57) ABSTRACT

An electronic device may include: a communication module supporting wireless communication; and a processor. The processor may be configured to: establish, through the communication module, a first communication link with a first external electronic device, and a second communication link with a second external electronic device; acquire first audio data and second audio data on the basis of a command for outputting stereo audio; transmit the first audio data to the first external electronic device by using the first communication link, and transmit the second audio data to the second external electronic device by using the second communication link; and in response to identification of at least one of a communication deterioration in the second external electronic device, releasing of a connection, and releasing of wearing by a user, transmit the first audio data and the
(Continued)

second audio data to the first external electronic device by using the first communication link so that the first external electronic device transmits the second audio data to the second external electronic device.

17 Claims, 17 Drawing Sheets

(58) Field of Classification Search
    USPC .......................................................... 381/74
    See application file for complete search history.

(56) References Cited

U.S. PATENT DOCUMENTS

| | | |
|---|---|---|
| 10,840,995 B1 | 11/2020 | Luong et al. |
| 2014/0348327 A1 | 11/2014 | Linde et al. |
| 2017/0164089 A1 | 6/2017 | Lee et al. |
| 2017/0366924 A1 | 12/2017 | Thoen |
| 2018/0077493 A1 | 3/2018 | Watson et al. |
| 2019/0034161 A1* | 1/2019 | Jo ........................ G06F 3/04842 |
| 2019/0052961 A1 | 2/2019 | Yun et al. |
| 2020/0288292 A1 | 9/2020 | Cheong et al. |
| 2020/0396028 A1 | 12/2020 | Haartsen et al. |
| 2021/0385893 A1* | 12/2021 | Jin ........................ H04W 12/55 |
| 2022/0319553 A1* | 10/2022 | Cheong ................ G11B 27/031 |

FOREIGN PATENT DOCUMENTS

| | | |
|---|---|---|
| KR | 20190016802 A | 2/2019 |
| KR | 20200106742 A | 9/2020 |

OTHER PUBLICATIONS

Written Opinion of the ISA for PCT/KR2022/000568 mailed Apr. 19, 2022, 4 pages.

* cited by examiner

ELECTRONIC DEVICE FOR PROCESSING AUDIO DATA AND OPERATION METHOD THEREFOR

CROSS REFERENCE TO RELATED APPLICATIONS

This application is a continuation of International Application No. PCT/KR2022/000568 filed on Jan. 12, 2022, designating the United States, in the Korean Intellectual Property Receiving Office, and claiming priority to Korean Patent Application No. 10-2021-0003782 filed on Jan. 12, 2021, PCT/KR2021/017980 filed Dec. 1, 2021, and Korea Patent Application No. 10-2022-0003829 filed on Jan. 11, 2022, the disclosures of which are all hereby incorporated by reference herein in their entireties.

BACKGROUND

Field

Various example embodiments relate to an electronic device for processing audio data and/or a method of operating the same.

Description of Related Art

Along with the development of wireless communication technologies, an electronic device may communicate with another electronic device through various wireless communication technologies. For example, Bluetooth communication technology refers to a short-range wireless communication technology that allows electronic devices to connect to each other and exchange data or information. In addition, Bluetooth communication technology may include Bluetooth legacy (or classic) network technology or a Bluetooth low energy (BLE) network, and have various connection types of topologies such as piconet and scatternet.

Electronic devices may share data with each other with low power by various wireless communication technologies such as Bluetooth or wireless fidelity (WiFi). An electronic device may be connected to external wireless communication devices by such a wireless communication technology and transmit audio data for content executed in the electronic device to the external wireless communication devices, and the external wireless communication devices may process and output the audio data to the user.

SUMMARY

An electronic device using a short-range wireless communication technology, for example, an audio over BLE (AoBLE) topology for audio transmission may establish independent communication links with external electronic devices and communicate with the respective external electronic devices (e.g., wireless earphones) using the independent communication links. For example, in order to output stereo audio data, the electronic device may transmit first mono audio packets to a first external electronic device, and transmit second mono audio packets to a second external electronic device.

When communication deterioration (or disconnection (e.g., communication disconnection)) occurs in a communication link connected to a specific external electronic device (e.g., the second external electronic device) due to a physical obstacle or surrounding radio interference, the external electronic device (e.g., the second external electronic device) may not successfully receive corresponding mono audio packets from the electronic device. For example, the external electronic device may output a loud sound or no sound due to buffer underrun (or buffer overflow). Moreover, the electronic device may consume excessive power to transmit audio data to the external electronic device having the deteriorated (or disconnected) communication link.

Various example embodiments may provide an electronic device which when establishing a communication link with each of two external electronic devices and transmitting audio data on each communication link, upon identification of communication deterioration (or disconnection) of one communication link, transmits stereo audio data using the other communication link, and a method of operating the same.

Various example embodiments may provide an electronic device which when establishing a communication link with each of two wearable external electronic devices and transmitting audio data on each communication link, upon identification of non-wearing (or removal) of one external electronic device by a user, transmitting stereo audio data using the other communication link, and a method of operating the same.

An electronic device according to various example embodiments may include a communication module, comprising communication circuitry, supporting wireless communication, and a processor. The processor may be configured to establish a first communication link with a first external electronic device and establish a second communication link with a second external electronic device, through the communication module, obtain first audio data and second audio data based on a command to output stereo audio, transmit the first audio data to the first external electronic device using the first communication link, transmit the second audio data to the second external electronic device using the second communication link, and transmit the first audio data and the second audio data to the first external electronic device using the first communication link in response to identification of at least one of communication deterioration, disconnection, or removal from a user of the second external electronic device, to allow the first external electronic device to transmit the second audio data to the second external electronic device.

A method of operating an electronic device according to various example embodiments may include establishing a first communication link with a first external electronic device, establishing a second communication link with a second external electronic device, obtaining first audio data and second audio data based on a command to output stereo audio, transmitting the first audio data to the first external electronic device using the first communication link, transmitting the second audio data to the second external electronic device using the second communication link, and transmitting the first audio data and the second audio data to the first external electronic device using the first communication link in response to identification of at least one of communication deterioration, disconnection, or removal from a user of the second external electronic device, to allow the first external electronic device to transmit the second audio data to the second external electronic device.

A first external electronic device according to various example embodiments may include a speaker, a communication module, comprising communication circuitry, supporting wireless communication, and a processor. The processor may be configured to establish a first communication link with an electronic device and establish a second communication link with a second external electronic device, through the communication module, receive first audio data using the first communication link, perform a first operation for outputting the first audio data through the speaker, and when the first audio data and second audio data related to the second external electronic device are received using the first communication link, and a given condition is satisfied, perform the first operation for the first audio data and transmit at least one second audio packet including the second audio data to the second external electronic device using the second communication link.

When an electronic device according to various example embodiments identifies that a first external electronic device is not capable of successfully reproducing audio data any longer due to a cause such as communication deterioration, disconnection, or removal during transmission of audio data through a communication link established with each of a plurality of external electronic devices, the electronic device may transmit stereo audio data using the communication link with a second external electronic device so that the second external electronic device may transmit the audio data to the first external electronic device.

BRIEF DESCRIPTION OF DRAWINGS

The foregoing and other features of example embodiments will become more apparent from the following detailed description of embodiments when read in conjunction with the accompanying drawings. In the drawings, like reference numerals refer to like elements.

DETAILED DESCRIPTION

Figure 1:
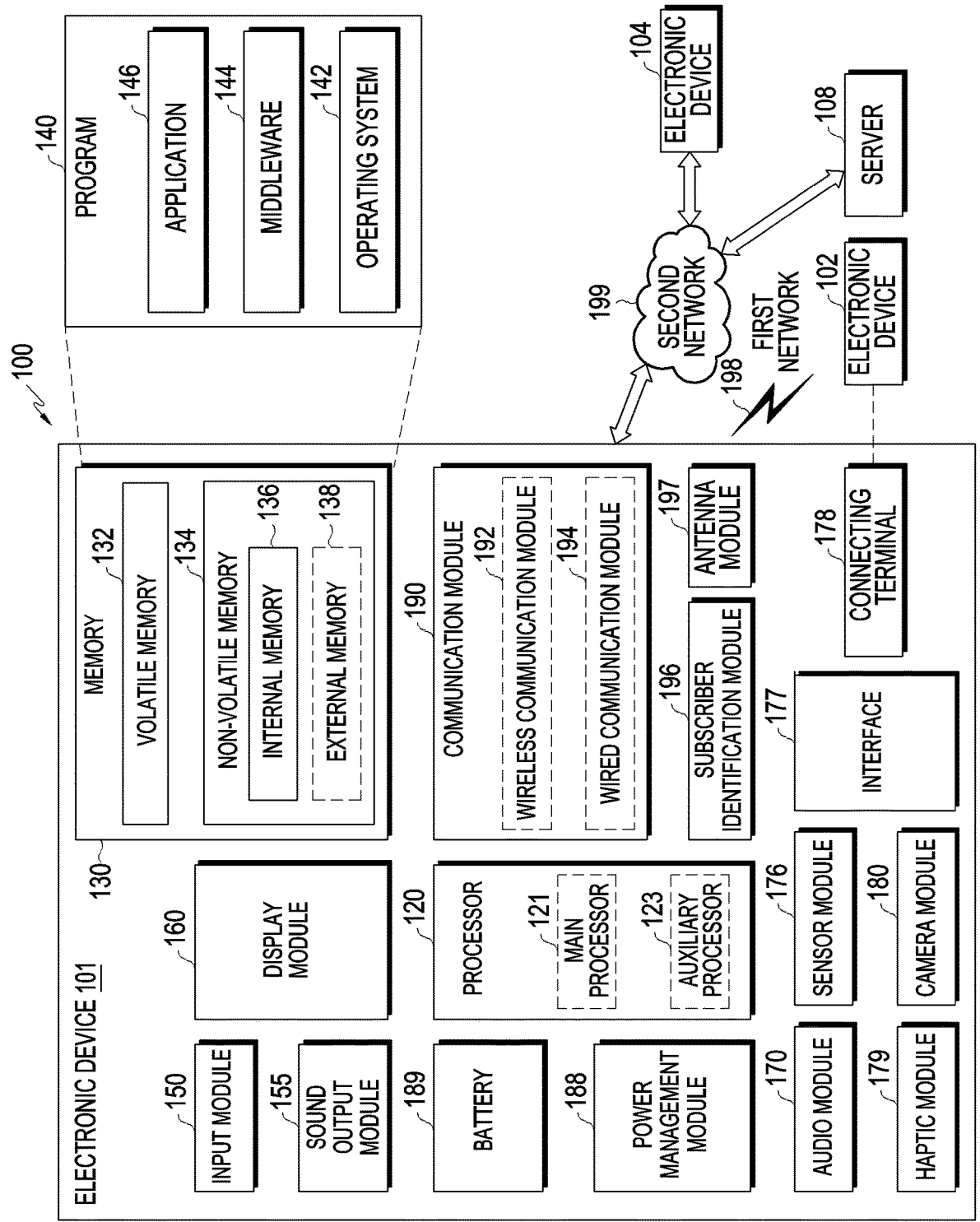
FIG. 1 is a block diagram illustrating an electronic device in a network environment according to various example embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing units (CPU) or an application processor (AP)), or an auxiliary processor 123 (e.g., a graphics processing units (GPU), a neural processing units (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a board (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form an mmWave antenna module. According to an embodiment, the mmWave antenna module may include a printed circuit board, a RFIC disposed on a first surface (e.g., the bottom surface) of the printed circuit board, or adjacent to the first surface and capable of supporting a specified high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the specified high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
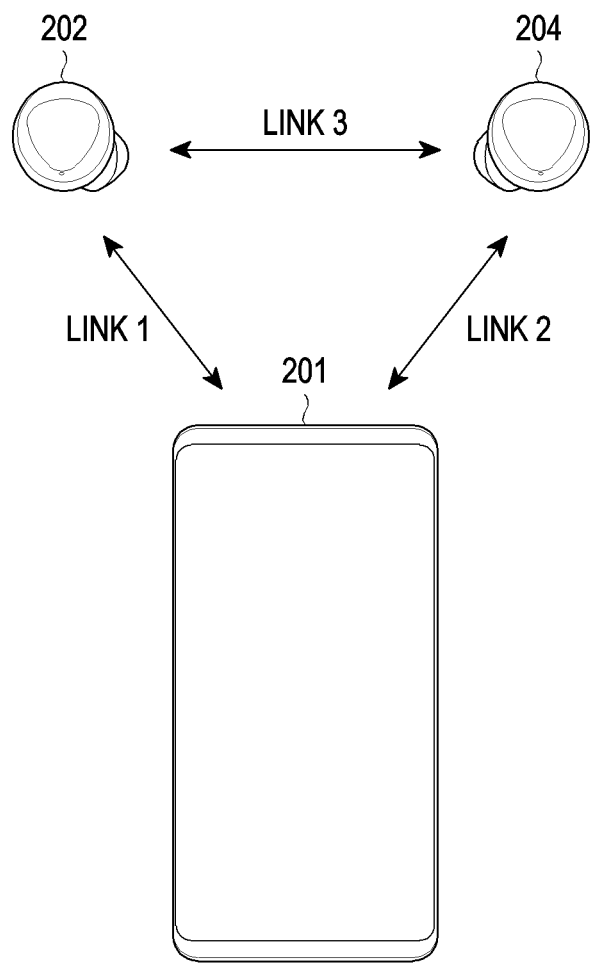
FIGS. 2A and 2B are block diagrams illustrating an electronic system according to various example embodiments.
Figure 2B:
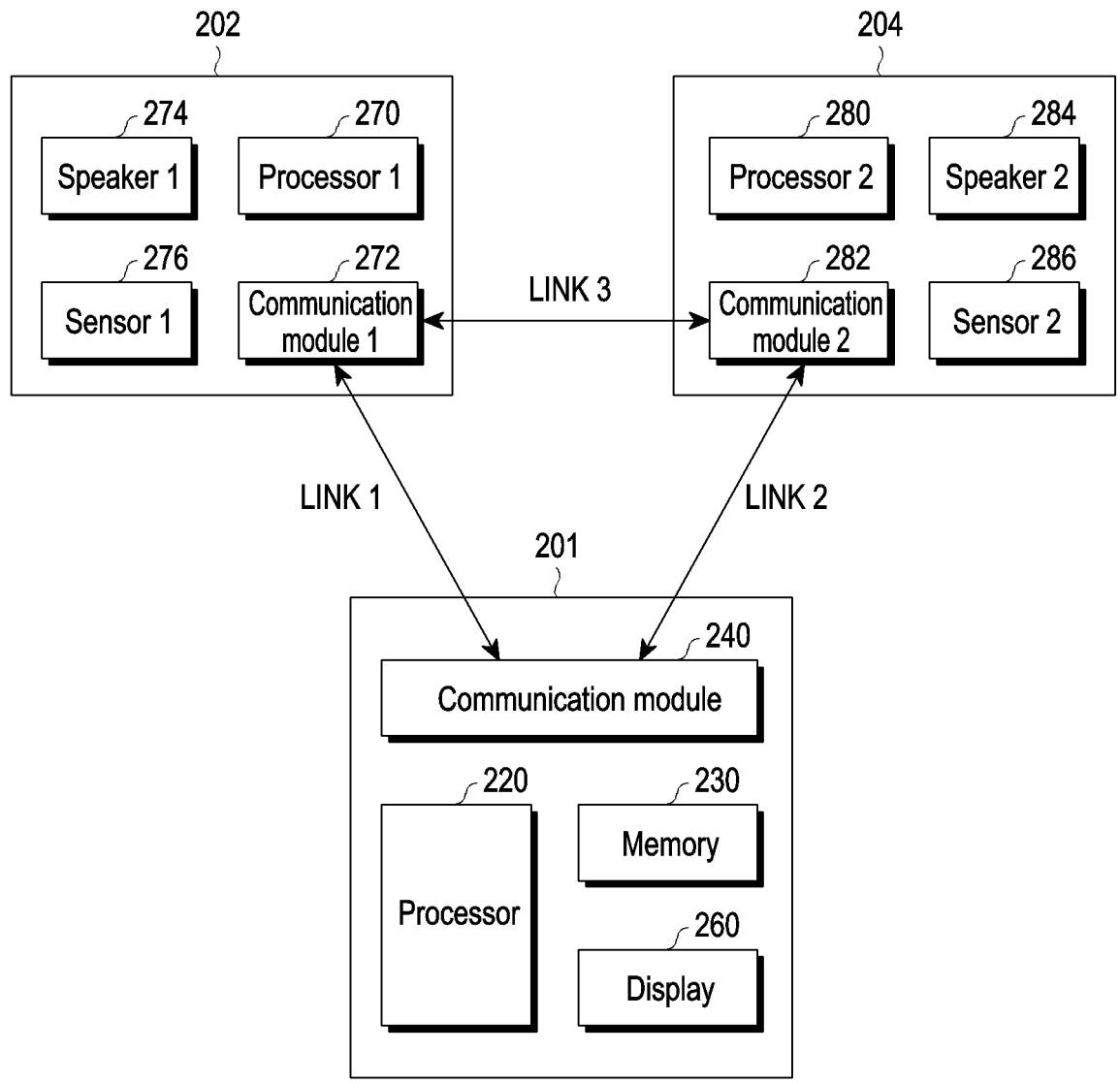

FIGS. 2A and 2B are block diagrams illustrating an electronic system according to various embodiments.

Referring to FIG. 2A, the electronic system may include an electronic device 201 and a plurality of external electronic devices (e.g., a first external electronic device 202 and a second external electronic device 204). For example, the electronic device 201, the first external electronic device 202, and the second external electronic device 204 may be implemented the same as or similar to the electronic device 101 of FIG. 1. For example, the electronic device 201 may be implemented as a smartphone. The first external electronic device 202 may be implemented as an earphone of a first channel (e.g., an earphone worn on the right ear), and the second external electronic device 204 may be implemented as an earphone of a second channel (e.g., an earphone worn on the left ear). According to an embodiment, the first external electronic device 202 and the second external electronic device 204 may be, but not limited to, a pair.

According to various embodiments, the electronic device 201 may transmit and receive data to and from the plurality of external electronic devices 202 and 204. To this end, the electronic device 201 may establish communication links with the plurality of external electronic devices 202 and 204 by a short-range communication scheme (e.g., a Bluetooth communication scheme, a Bluetooth low energy (BLE) communication scheme, an audio over BLE (AoBLE) communication scheme, or a wireless fidelity (WiFi) communication scheme). In FIG. 2A, a method of establishing communication links for transmitting and receiving data to and from the plurality of external electronic devices 202 and 204 by the electronic device 201 will be described. However, this is only exemplary, and the technical spirit of the disclosure may not be limited thereto. For example, the electronic device 201 may establish communication links with the plurality of external electronic devices 202 and 204 in various manners.

Referring to FIG. 2A, according to various embodiments, the electronic device 201 may establish a first communication link LINK1 with the first external electronic device 202 and a second communication link LINK2 with the second external electronic device 204. The electronic device 201 may transmit and receive data to and from the first external electronic device 202 through the first communication link LINK1, and transmit and receive data to and from the second external electronic device 204 through the second communication link LINK2. According to an embodiment, the electronic device 201 may manage communication resources to transmit and receive data to and from the first external electronic device 202 or the second external electronic device 204. For example, the electronic device 201 may communicate with the first external electronic device 202 or the second external electronic device 204 in frequency division or time division.

According to various embodiments, the first external electronic device 202 may establish a third communication link LINK3 with the second external electronic device 204. The first external electronic device 202 may transmit and receive data to and from the second external electronic device 204 through the third communication link LINK3.

According to various embodiments, the first communication link LINK1, the second communication link LINK2, and the third communication link LINK3 may be established as BLE communication links. However, the technical spirit of the disclosure is not limited thereto, and the first communication link LINK1, the second communication link LINK2, and the third communication link LINK3 may be established as various types of communication links.

Referring to FIG. 2B, the electronic device 201 may include a processor 220, memory 230, a communication module 240 which may comprise communication circuitry, and a display 260.

According to various embodiments, the processor 220 may provide overall control to the electronic device 201. For example, the processor 220 may be implemented the same as or similar to the processor 120 of FIG. 1.

According to various embodiments, the processor 220 may obtain audio data to output audio. According to an embodiment, the processor 220 may obtain audio data through an external electronic device (e.g., a streaming server). Alternatively, the processor 220 may obtain audio data stored in the memory 230 (e.g., the memory 130 of FIG. 1). For example, the processor 220 may obtain stereo audio data that enables output of stereo audio.

According to various embodiments, the processor 220 may identify a command to output stereo audio. For example, the command to output stereo audio may include, for example, a command to play stereo audio, a command to play content (e.g., video) including stereo audio, a command to originate/terminate a call, and/or a command to originate/terminate a video call.

According to various embodiments, the processor 220 may obtain (or generate) first audio data corresponding to a first channel (e.g., a right (R) channel) and second audio data corresponding to a second channel (e.g., a left (L) channel) based on the command to output stereo audio. For example, each of the first audio data and the second audio data may include mono audio data. Further, the processor 220 may obtain first audio packets including the first audio data and second audio packets including the second audio data. For example, the first audio packets may include the first audio data specified for the first external electronic device 202 (e.g., a right earphone) among stereo audio data, and the second audio packets may include the second audio data specified for the second external electronic device 204 (e.g., the left earphone) among the stereo audio data.

According to various embodiments, the processor 220 may establish the first communication link with the first external electronic device 202 and the second communication link with the external electronic device 204 through the communication module 240 (e.g., the communication module 190 of FIG. 1, comprising communication circuitry). For example, the communication module 240 may support a short-range communication technology (e.g., the Bluetooth communication technology or the WiFi communication technology).

According to various embodiments, the processor 220 may transmit the first audio data to the first external electronic device 202 using the first communication link and the second audio data to the second external electronic device 204 using the second communication link through the communication module 240. For example, the processor 220 may transmit the first audio data and the second audio data to the first and second external electronic devices 202 and 204, using the first communication link and the second communication link, respectively according to a specified order within each time interval.

For example, the processor 220 may transmit a first audio packet including first audio data to the first external electronic device 202 during a specified time (e.g., a first sub-interval) within a first time interval, and transmit a second audio packet including second audio data to the second external electronic device 204 during a specified time (e.g., a second sub-interval) within the first time interval. Subsequently, the processor 220 may transmit a third audio packet including first audio data to the first external electronic device 202 during a specified time (e.g., a third sub-interval) within a second time interval after the first time interval, and transmit a second audio packet including second audio data to the second external electronic device 204 during a specified time (e.g., a fourth sub-interval) within the second time interval. The second time interval may be different from the first time interval.

According to various embodiments, the processor 220 may identify connection states of the first communication link and the second communication link through the communication module 240. For example, the processor 220 may identify whether the first audio data and the second audio data are smoothly transmittable using the first communication link and the second communication link. For example, the processor 220 may identify whether the connection state of the first communication link or the second communication link is a communication deterioration state not suitable for transmission of the corresponding audio data. For example, communication deterioration may be related to a weak electric field condition, deterioration of reception quality, increased radio signal interference, excess of a retransmission number, and/or disconnection, which is caused by a physical obstacle or a difference in physical distance. For example, communication deterioration may be determined based on at least one of a weak electric field condition, deterioration of reception quality, increased radio signal interference, excess of a retransmission number, and/or disconnection for the connection state of the communication link.

In an embodiment, the processor 220 may receive information about the connection state (e.g., good communication, communication deterioration, or disconnection) or wearing state (e.g., worn or not worn) of each external electronic device (e.g., the second external electronic device 204) from the first external electronic device 202 or the second external electronic device 204 through the communication module 240, and notify the other external electronic device (e.g., the first external electronic device 202) of the information. In an embodiment, the processor 220 may receive information about the connection state (e.g., good communication, communication deterioration, or disconnection) of the third communication link from the first external electronic device 202 or the second external electronic device 204 through the communication module 240, and notify the other external electronic device (e.g., the first external electronic device 202) of the information.

According to various embodiments, the processor 220 may identify, through the communication module 240, the connection states of the first communication link and the second communication link and/or the wearing states of the first external electronic device 202 and the second external electronic device 204. For example, the processor 220 may identify whether the first external electronic device 202 and the second external electronic device 204 are capable of smoothly outputting (e.g., reproducing) first audio and second audio. In an embodiment, the processor 220 may identify whether the first external electronic device 202 or the second external electronic device 204 is worn on a user's body (e.g., the ear). For example, the wearing state of the first external electronic device 202 or the second external electronic device 204 may be determined based on information (e.g., worn or not worn) about the wearing state from the first external electronic device 202 or the second external electronic device 204 through the communication module 240.

According to various embodiments, when identifying communication deterioration (or disconnection) or removal of any one of the first external electronic device 202 and the second external electronic device 204, the processor 220 may transmit stereo audio data including first audio data and second audio data, using the other one of the first communication link and the second communication link. According to an embodiment, the processor 220 may transmit first audio packets and second audio packets through the first communication link and the second communication link, respectively. For example, when determining that the second external electronic device 204 is capable of successfully outputting the second audio no longer, the processor 220 may transmit the stereo audio data (e.g., a stereo audio packet or first and second audio packets) to the first external electronic device 202 during a specified time.

In an embodiment, the first audio data (audio data of the first channel) and the second audio data (audio data of the second channel) may be separately included in the stereo audio packet in a dual mono manner. In an embodiment, the first audio data and the second audio data may be merged and included in the stereo audio packet in a joint stereo manner.

According to another embodiment, the processor 220 may sequentially transmit the first audio packet and the second audio packet, using any one of the first communication link and the second communication link, which is in a good connection state. For example, the processor 220 may transmit the first audio packet to the first external electronic device 202 through the first communication link during a specified time, and then transmit the second audio packet to the first external electronic device 202 through the first communication link during a specified time.

In an embodiment, the processor 220 may transmit at least one second audio packet including second audio data to the second external electronic device 204 through the second communication link to determine whether the connection state of the second communication link has been recovered (normalized) during the specified time during which the stereo audio data or the first and second audio data are transmitted through the first communication link.

According to various embodiments, when identifying communication deterioration (or disconnection) of a specific communication link or removal of a specific external electronic device, the processor 220 may identify a start time to transmit stereo audio packets. For example, the processor 220 may identify a transmission time of the stereo audio packets based on the reception sensitivity of packets (e.g., ACK packets) received from the first external electronic device 202 or the second external electronic device 204 and/or an average reception sensitivity of packets received from the first external electronic device 202 or the second external electronic device 204 in a unit time interval.

According to an embodiment, the processor 220 may identify the transmission time of the stereo audio packets based on a time at which an audio packet is retransmitted. For example, when an ongoing audio packet of a specific sequence number is retransmitted during a specified time or longer, the processor 220 may transmit the stereo audio packets. According to another embodiment, the processor 220 may identify the transmission time of the stereo audio packets based on the number of retransmissions of an audio packet. For example, when a specified number of or more ongoing audio packets of a specific sequence number are retransmitted, the processor 220 may transmit the stereo audio packets. According to another embodiment, the processor 222 may identify the transmission time of the stereo audio packets based on the number of times an audio packet is retransmitted during a specified time. For example, when the number of audio packets retransmitted during the specified time is equal to or greater than a specified threshold, the processor 220 may transmit the stereo audio packets.

According to various embodiments, the processor 220 may identify the transmission time of the stereo audio packets based on whether the first external electronic device 202 and/or the second external electronic device 204 is worn. According to an embodiment, in the state where the first external electronic device 202 and the second external electronic device 204 are worn on the user's body (e.g., the ears), the processor 220 may transmit mono audio packets to the external electronic devices 202 and 204. When identifying one external electronic device (e.g., the second external electronic device 204) has been removed, the processor 220 may transmit the stereo audio packets through the communication link (e.g., the first communication link) with the other external electronic device (e.g., the first external electronic device 204).

According to an embodiment, when identifying a signal indicating that only one of the first external electronic device 202 and the second external electronic device 204 is worn on the user's body (e.g., an ear), for example, through the communication module 240, the processor 220 may transmit the stereo audio packets to the worn external electronic device. According to an embodiment, when identifying a signal indicating that one of the first external electronic device 202 and the second external electronic device 204 has been removed from the user's body (e.g., an ear) (e.g., information (not worn) about a wearing state), for example, through the communication module 240, the processor 220 may not transmit corresponding audio packets to the removed external electronic device. According to an embodiment, when identifying a signal indicating that both of the first external electronic device 202 and the second external electronic device 204 have been removed from the user's body, the processor 220 may not transmit audio packets (e.g., stereo audio packets or mono audio packets) to the first external electronic device 202 and the second external electronic device 204.

According to various embodiments, the processor 220 may display information about the states of the first external electronic device 202 and the second external electronic device 204 through the display 260 (e.g., the display module 160 of FIG. 1, comprising a display). For example, when identifying communication deterioration of any one of the first communication link and the second communication link, the processor 220 may display information about the deterioration of the corresponding communication link on the display 260.

According to various embodiments, the processor 220 may obtain information about the wearing states of the plurality of external electronic devices 202 and 204 through the communication module 240. For example, when identifying its wearing state on the user's body (e.g., ear) by a sensor 276 or 286 included in each of the plurality of external electronic devices 202 and 204, each of the plurality of external electronic devices 202 and 204 may transmit information about the wearing state (e.g., worn or not worn) to the electronic device 201. The processor 220 may identify the wearing states (e.g., worn or not worn) of the plurality of respective external electronic devices 202 and 204 based on the information about the wearing states received from the plurality of respective external electronic devices 202 and 204, for example, through the communication module 240. Further, the processor 220 may display the information about the wearing states of the plurality of respective external electronic devices 202 and 204 through the display 260.

According to various embodiments, the first external electronic device 202 may include a first processor 270, a first communication module 272, a first speaker 274, and a first sensor 276.

According to various embodiments, the first processor 270 may provide overall control to the first external electronic device 202. For example, the first processor 270 may be implemented the same as or similar to the processor 120 of FIG. 1.

According to various embodiments, the first processor 270 may establish the first communication link with the electronic device 201 and the third communication link with the second external electronic device 204 through the first communication module 272.

According to various embodiments, the first processor 270 may receive a first audio packet including first audio data (e.g., mono audio data) from the electronic device 201, using the first communication link. The first processor 270 may perform a first operation for outputting the first audio data through the first speaker 274 based on the first audio packet. For example, the first operation may include obtaining the first audio data by decoding the first audio packet, and writing the first audio data to a buffer (e.g., a digital signal processing (DSP) buffer). Subsequently, the first processor 270 may output the first audio data through the first speaker 274 based on sync information included in the first audio packet.

According to various embodiments, the first processor 270 may receive a stereo audio packet including first audio data and second audio data from the electronic device 201, using the first communication link. According to an embodiment, the first processor 270 may sequentially receive a first audio packet including the first audio data and a second audio packet including the second audio data from the electronic device 101 through the first communication link. The first processor 270 may perform the first operation for outputting the first audio data through the first speaker 274 and transmit the second audio packet including the second audio data to the second external electronic device 204, using the third communication link.

According to various embodiments, in a state in which the first processor 270 has failed to receive the first audio data from the electronic device 201, using the first communication link (e.g., communication deterioration of the first communication link), the first processor 270 may receive the first audio packet from the second external electronic device 204, using the third communication link. The first processor 270 may perform the first operation for outputting the first audio data included in the first audio packet through the first speaker 274, and output the first audio data through the first speaker 274.

According to various embodiments, the first processor 270 may obtain information (e.g., worn or not worn) about the wearing state of the first external electronic device 202 through the first sensor 276. In addition, the first processor 270 may transmit the information about the wearing state of the first external electronic device 202 to the electronic device 201 through the first communication module 272 (e.g., a communication module supporting the Bluetooth communication technology). For example, the first sensor 276 may include at least one of a proximity sensor or a pressure sensor. According to an embodiment, the first processor 270 may obtain the information about the wearing state of the first external electronic device 202 through the first sensor 276, and if necessary (e.g., not worn), activate the first communication module 272 and transmit the information about the wearing state of the first external electronic device 202 to the electronic device 201. In an embodiment, when the first external electronic device 202 is not worn, the first processor 270 may deactivate the first communication module 272 (which may comprise at least one communication circuitry) after transmitting the information about the wearing state.

According to various embodiments, the second external electronic device 204 may include a second processor 280, a second communication module 282 (which may comprise at least one communication circuitry), a second speaker 284, and a second sensor 286.

According to various embodiments, the second processor 280 may provide overall control to the second external electronic device 204. For example, the second processor 280 may be implemented the same as or similar to the processor 120 of FIG. 1.

According to various embodiments, the second processor 280 may receive a second audio packet including second audio data (e.g., mono audio data) from the electronic device 201, using the second communication link. The second processor 280 may perform a second operation for outputting the second audio data through the second speaker 284 based on the second audio packet. For example, the second operation may include obtaining the second audio data by decoding the second audio packet, and writing the second audio data to a buffer (e.g., a DSP buffer). Then, the second processor 280 may output the second audio data through the second speaker 284 based on sync information included in the second audio packet.

According to various embodiments, the second processor 280 may receive a stereo audio packet including first audio data and second audio data from the electronic device 201, using the second communication link. According to an embodiment, the second processor 280 may sequentially receive a second audio packet including the second audio data and a first audio packet including the first audio data from the electronic device 101 through the second communication link. The second processor 280 may perform the second operation for outputting the second audio data through the second speaker 284 and transmit the first audio packet including the first audio data to the first external electronic device 202, using the third communication link.

According to various embodiments, in a state in which the second processor 280 has failed to receive the second audio data from the electronic device 201, using the second communication link (e.g., communication deterioration of the second communication link), the second processor 280 may receive the second audio packet from the first external electronic device 202, using the third communication link. The second processor 280 may perform the second operation for outputting the second audio data included in the second audio packet through the second speaker 274, and output the second audio data through the second speaker 384.

According to various embodiments, the second processor 280 may obtain information (e.g., worn or not worn) about the wearing state of the second external electronic device 204 through the second sensor 286. In addition, the second processor 280 may transmit the information about the wearing state of the second external electronic device 204 to the electronic device 201 through the second communication module 282 (e.g., a communication module supporting the Bluetooth communication technology). For example, the second sensor 286 may include at least one of a proximity sensor or a pressure sensor. According to an embodiment, the second processor 280 may obtain the information about the wearing state of the second external electronic device 204 through the second sensor 286, and if necessary (e.g., not worn), activate the second communication module 282 and transmit the information about the wearing state of the second external electronic device 204 to the electronic device 201. In an embodiment, when the second external electronic device 204 is not worn, the second processor 280 may deactivate the second communication module 282 after transmitting the information about the wearing state.

Although each of the first external electronic device 202 and the second external electronic device 204 is shown as including the single speaker 274 or 284 in FIG. 2B, this is only for convenience of description, and the number of speakers may not be limited thereto. For example, each of the first external electronic device 202 and the second external electronic device 204 may include a plurality of speakers. According to an embodiment, each of the first external electronic device 202 and the second external electronic device 204 may output audio data received from the electronic device 201 through the plurality of speakers.

According to various embodiments, the first external electronic device 202 and/or the second external electronic device 204 may further include at least one microphone (not shown). For example, the first external electronic device 202 may receive external sound through the microphone and transmit audio data based on the received sound to the electronic device 201 through the first communication link. In another example, the second external electronic device 204 may receive external sound through the microphone and transmit audio data based on the received sound to the electronic device 201 through the second communication link.

At least some of the following operations of the electronic device 201 may be performed by the processor 220. Further, at least some of the operations of the first external electronic device 202 may be performed by the first processor 270, and at least some of the operations of the second external electronic device 204 may be performed by the second processor 280.

For convenience of description, the following description will be given mainly of operations of the electronic device 201, the first external electronic device 202, and the second external electronic device 204 in the context of communication deterioration (or disconnection) of the second communication link. However, the description does not limit the technical spirit of the disclosure, and may be applied even when the first communication link is deteriorated (or disconnected) or the first external electronic device 202 is not worn. For example, when the first communication link is deteriorated (or disconnected) or the first external electronic device 202 is not worn, the electronic device 201 may be configured to transmit a first audio packet (or a stereo audio packet) to the second external electronic device 204, and the second external electronic device 204 may be configured to transmit (or forward) the received first audio packet (or the first audio packet obtained from the received stereo audio packet) to the first external electronic device 202 through the third communication link.

Figure 3:
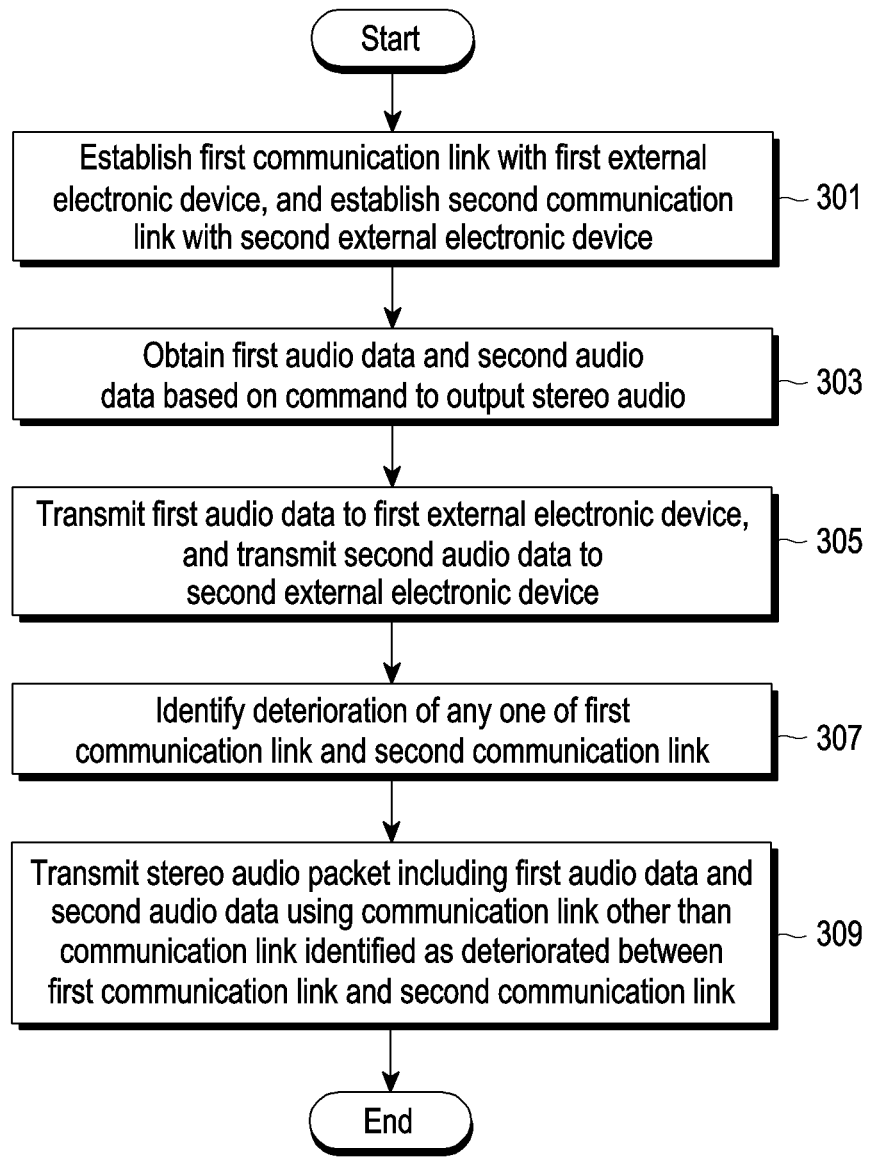
FIG. 3 is a flowchart illustrating a method of operating an electronic device according to various example embodiments.

FIG. 3 is a flowchart illustrating an operation of an electronic device according to various embodiments.

Referring to FIG. 3, according to various embodiments, in operation 301, an electronic device (e.g., the electronic device 201 of FIG. 2A) may establish a first communication link with a first external electronic device (e.g., the first external electronic device 202 of FIG. 2A) and a second communication link with a second external electronic device (e.g., the second external electronic device 204 of FIG. 2A), using a communication module (e.g., the communication module 240 of FIG. 2B).

According to various embodiments, in operation 303, the electronic device 201 may obtain (or generate) first audio data (e.g., at least one first audio packet) and second audio data (e.g., at least one second audio packet) based on a command to output stereo audio. For example, the electronic device 201 may obtain first mono audio data corresponding to the first channel and second mono audio data corresponding to the second channel from stereo audio data, in consideration of the first external electronic device 202 and the second external electronic device 204. Further, the electronic device 201 may generate a first audio packet including the first mono audio data and a second audio packet including the second mono audio data.

For example, the electronic device 201 may obtain (or generate) a service data unit (SDU) including audio data to be transmitted from the processor 220 to the communication module 240 by the processor 220. The communication module 240 may receive the SDU from the processor 220, convert the SDU into a protocol data unit (PDU) (e.g., an audio packet) according to a Bluetooth protocol, and transmit the PDU to the first external electronic device 202 and the second external electronic device 204. In an embodiment, the communication module 240 functioning as a Bluetooth controller may receive SDUs for the first communication link, link 1 and the second communication link, link 2 from the processor 220, and generate a PDU for each of the first communication link, Link 1 and the second communication link, Link 2. Alternatively, the communication module 240 may receive one stereo SDU from the processor 220 and generate a stereo PDU for both of the first communication link, Link 1 and the second communication link, Link 2.

According to various embodiments, in operation 305, the electronic device 201 may transmit the first audio data (e.g., the at least one first audio packet) to the first external electronic device, using the first communication link and transmit the second audio data (e.g., the at least one second audio packet) to the second external electronic device, using the second communication link.

According to various embodiments, in operation 307, the electronic device 201 may identify communication deterioration (or disconnection) of any one of the first external electronic device and the second external electronic device. For example, the electronic device 201 may identify communication deterioration (or disconnection) of the corresponding communication link in consideration of at least one of reception or non-reception of a received signal (e.g., an ACK or a NACK) obtained from the external electronic device 202 or 204, the strength of the received signal, or the noise level of the received signal. In an embodiment, the electronic device 201 may identify the communication deterioration of the second communication link according to at least one of various indicators such as a bit rate, a received signal strength, or a quality of service (QoS) setting.

For example, when the strength of the received signal is less than a specified value or the noise level of the received signal is higher than a specified level, the electronic device 201 may determine that the corresponding communication link is deteriorated. According to an embodiment, when the electronic device 201 fails to receive an ACK signal corresponding to a corresponding audio packet after transmitting a preset number of audio packets, the electronic device 201 may determine that the corresponding communication link is deteriorated. According to another embodiment, when the electronic device 201 fails to receive an ACK signal corresponding to a corresponding audio packet after transmitting at least one audio packet during a preset time, the electronic device 201 may determine that the corresponding communication link is deteriorated. According to another embodiment, upon receipt of a retransmission request (e.g., a NACK) for a corresponding audio packet a specified number of or more times from the first external electronic device 202 or the second external electronic device 204 after transmitting at least one first audio packet or second audio packet, the electronic device 201 may determine that the corresponding communication link is deteriorated. According to another embodiment, the electronic device 201 may identify that a corresponding external electronic device is not worn based on information (not worn) about a wearing state received from the first external electronic device 202 or the second external electronic device 204, and proceed to operation 309.

According to various embodiments, in operation 309, the electronic device 201 may transmit stereo audio data (e.g., at least one stereo audio packet) including first audio data and second audio data, using a communication link other than the communication link identified as deteriorated (or disconnected) between the first communication link and the second communication link or using a communication link connected, directly or indirectly, to an external electronic device other than an external electronic device identified as not worn between the first communication link and the second communication link. For example, when identifying communication deterioration of the second communication link, the electronic device 201 may transmit at least one stereo audio packet including first audio data and second audio data to the first external electronic device 202, using the first communication link. In another example, when identifying communication deterioration of the second communication link, the electronic device 201 may sequentially transmit the first audio data (e.g., a first audio packet) and the second audio data (e.g., a second audio packet) to the first external electronic device 202, using the first communication link. This may be done for the first external electronic device 202 to transmit the second audio data to the second external electronic device 204 using the third communication link, on behalf of the electronic device 201.

In an embodiment, with the second communication link not established with the second electronic device 204, the electronic device 201 may transmit the first audio data and the second audio data to the first external electronic device 202, using the first communication link as in operation 309. In an embodiment, when the electronic device 201 identifies communication deterioration, disconnection, or non-wearing of the second external electronic device 204 in a state in which the electronic device 201 has connected, directly or indirectly, the first communication link to the second external electronic device 202, the electronic device 201 may transmit the first audio data and the second audio data to the first external electronic device 202 using the first communication link as in operation 309. In an embodiment, the first external electronic device 202 may output (or reproduce) stereo audio including the first audio data and the second audio data, or transmit the second audio data to the second external device 204, while outputting the first audio.

Figure 4:
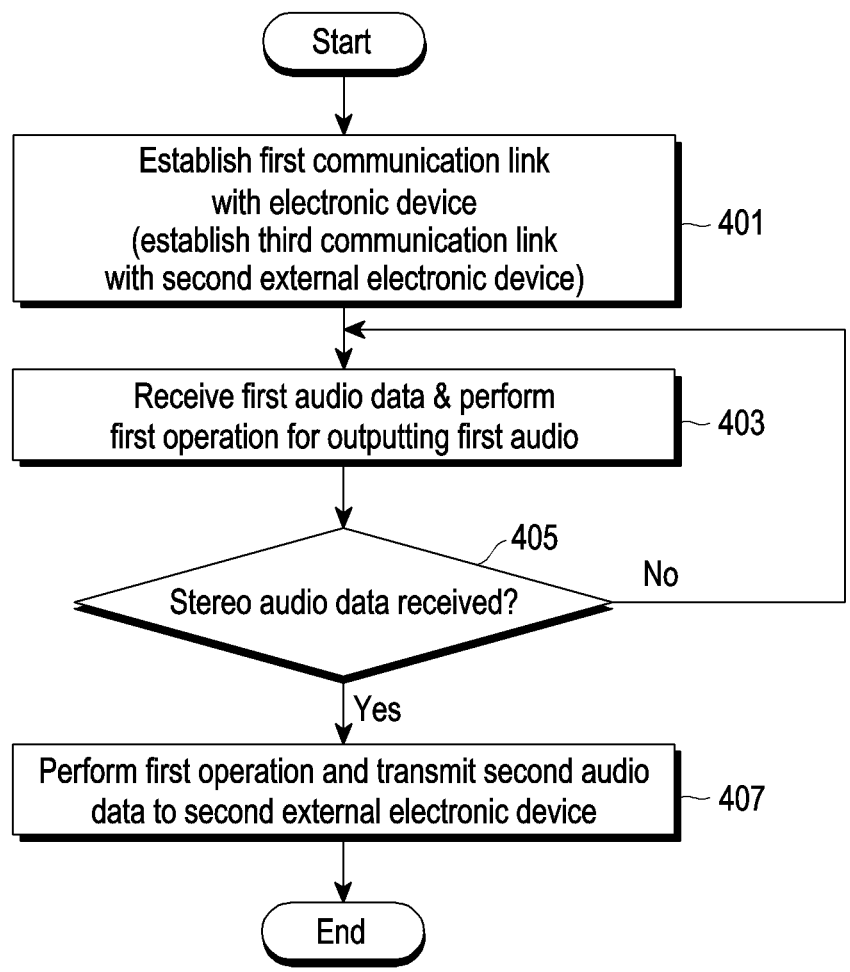
FIG. 4 is a flowchart illustrating a method of transmitting audio data to a second external electronic device by a first external electronic device according to various example embodiments.

FIG. 4 is a flowchart illustrating a method of transmitting audio data to a second external electronic device by a first external electronic device according to various embodiments.

Referring to FIG. 4, according to various embodiments, in operation 401, a first external electronic device (e.g., the first external electronic device 202 of FIG. 2A) may establish a first communication link with an electronic device (e.g., the electronic device 201 of FIG. 2A), using a communication module (e.g., the first communication module 272 of FIG. 2B). In an embodiment, the first external electronic device 202 may establish a third communication link for audio transmission with a second external electronic device (e.g., the second external electronic device 204 of FIG. 2A). In an embodiment, the establishment of the third communication link may be performed after operation 405 or before operation 407.

According to various embodiments, in operation 403, the first external electronic device 202 may receive first audio data (e.g., at least one first audio packet) from the electronic device 201, using the first communication link, and perform a first operation for outputting the first audio data.

According to various embodiments, in operation 405, the first external electronic device 202 may identify whether stereo audio data including the first audio data and second audio data (e.g., a stereo audio packet or a first audio packet and a second audio packet) has been received, using the first communication link. According to an embodiment, the first external electronic device 202 may identify whether the second audio data (e.g., the second audio packet) has been received together with the first audio data (e.g., the first audio packet), using the first communication link.

According to various embodiments, when the stereo audio data (or the second audio data) has not been received (no in operation 405), the first external electronic device 202 may perform the first operation for outputting the received first audio data. For example, the first operation may include an operation of outputting the first audio data through a speaker (e.g., the first speaker 274 of FIG. 2B) based on sync information included in the first audio packet. According to another embodiment, when the first external electronic device 202 receives a pre-specified request message from the electronic device 201, the first external electronic device 202 may receive the first audio data from the electronic device 201 and perform the first operation, regardless of whether the stereo audio data has been received. For example, when the second external electronic device 204 is not worn, when the second external electronic device 204 is not capable of successively receiving the second audio data (e.g., due to communication deterioration or disconnection), and/or when there is a user setting in the electronic device 201, the electronic device 201 may transmit the specified request message to the first external electronic device 202.

According to various embodiments, when the stereo audio data (or the second audio data) has been received (yes in operation 405), the first external electronic device 202 may perform the first operation and transmit the second audio data (e.g., the second audio packet) to the second external electronic device 204 in operation 407. For example, the first external electronic device 202 may obtain the second audio data by decoding the stereo audio packet including the first audio data and the second audio data, and generate the second audio packet including the second audio data.

In an embodiment, after detecting the reception of the stereo audio data (or the second audio data), the first external electronic device 202 may establish the third communication link for audio transmission to the second external electronic device 204, if necessary (e.g., when detecting that the third communication link has not been established). The first external electronic device 202 may transmit the generated second audio packet to the second external electronic device 204, using the third communication link. According to another embodiment, the first external electronic device 202 may transmit (or forward) the second audio packet received from the electronic device 201 using the first communication link to the second external electronic device 204 using the third communication link.

In an embodiment, after detecting the reception of the stereo audio data (or the second audio data), the first external electronic device 202 may selectively perform operation 407 by determining whether to perform audio transmission to the second external electronic device 204. In an embodiment, when the first electronic device 202 has failed to establish the third communication link with the second external electronic device 204, the third communication link suffers from communication deterioration, or the first electronic device 202 has received information (e.g., no worn) about a wearing state from the second external electronic device 204, the first external electronic device 204 may perform a third operation for outputting stereo audio including the first audio data and the second data without transmitting the second audio data to the second external electronic device 204. In an embodiment, the third operation may include the afore-described first operation and second operation.

Figure 5:
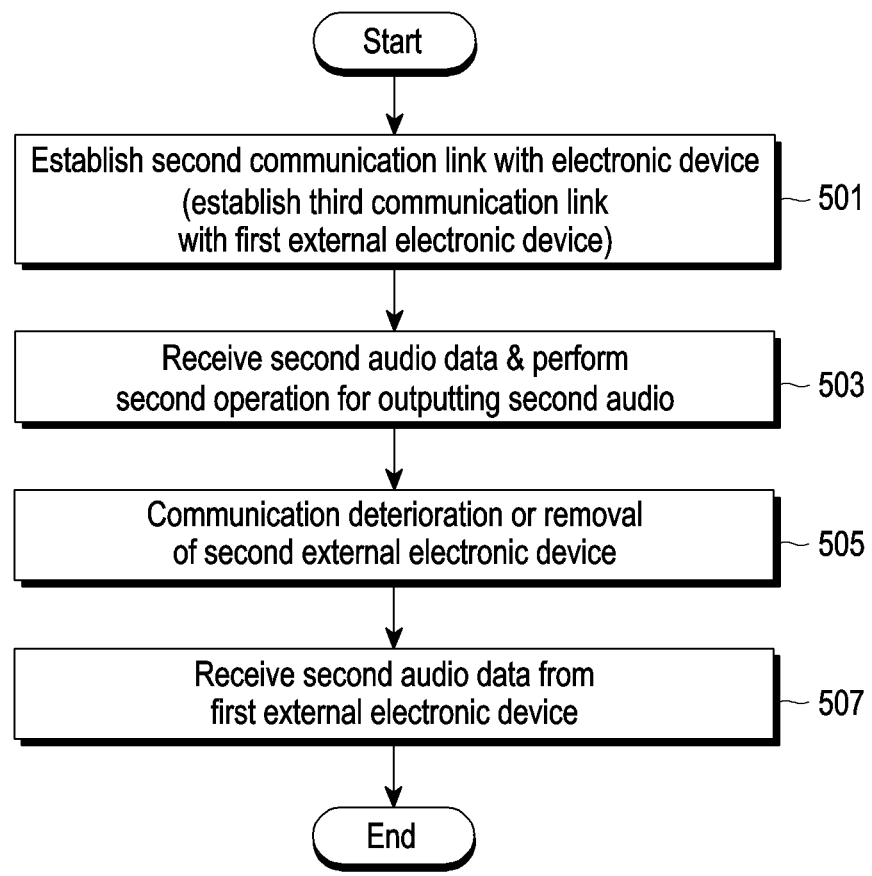
FIG. 5 is a flowchart illustrating a method of receiving audio data from a first external electronic device by a second external electronic device according to various example embodiments.

FIG. 5 is a flowchart illustrating a method of receiving audio data from a first external electronic device by a second external electronic device according to various embodiments.

Referring to FIG. 5, according to various embodiments, in operation 501, a second external electronic device (e.g., the second external electronic device 204 of FIG. 2) may establish a second communication link with an electronic device (e.g., the electronic device 201 of FIG. 2), using a communication module (e.g., the second communication module 282 of FIG. 2B). 282. In an embodiment, the second external electronic device 204 may establish a third communication link with a first external electronic device (e.g., the first external electronic device 202 of FIG. 2). Establishment of the third communication link may be performed after operation 505 or before operation 507 in an embodiment.

According to various embodiments, in operation 503, the second external electronic device 204 may receive second audio data (e.g., at least one second audio packet) from the electronic device 201, using the second communication link, and perform a second operation for outputting the second audio data. For example, the second operation may include an operation of outputting the second audio data through a speaker (e.g., the second speaker 284 of FIG. 2B) based on sync information included in the second audio packet.

According to various embodiments, as communication deterioration (or disconnection) occurs to the second communication link connected, directly or indirectly, to the second external electronic device 204 in operation 505, the second external electronic device 204 may fail to successfully receive the second audio data from the electronic device 201, using the second communication link. For example, communication deterioration (or disconnection) may occur to the second communication link due to a weak electric field condition, deterioration of reception quality, and radio signal interference and/or an increased retransmission number caused by a physical obstacle or a difference in physical distance between the electronic device 201 and the second external electronic device 204. In an embodiment, the second external electronic device 204 may request retransmission of the second audio data from the electronic device 201. In an embodiment, upon occurrence of communication deterioration (or disconnection) to the second communication link, the second external electronic device 204 may request retransmission of the second audio data from the first electronic device 202 through the third communication link. According to another embodiment, the second external electronic device 204 may transmit information (e.g., not worn) about a wearing state of the second external electronic device 202 to the electronic device 201 through the first external electronic device 202 or directly, and proceed to operation 507.

According to various embodiments, in operation 507, the second external electronic device 204 may receive the second audio data (e.g., at least one second audio packet) from the first external electronic device 202, using the third communication link. Accordingly, the second external electronic device 204 may receive the second audio data through the first external electronic device 202 in spite of the deterioration of the second communication link. According to an embodiment, the second external electronic device 204 may receive the second audio data through the first external electronic device 202 and perform the second operation for outputting the second audio data.

Figure 6:
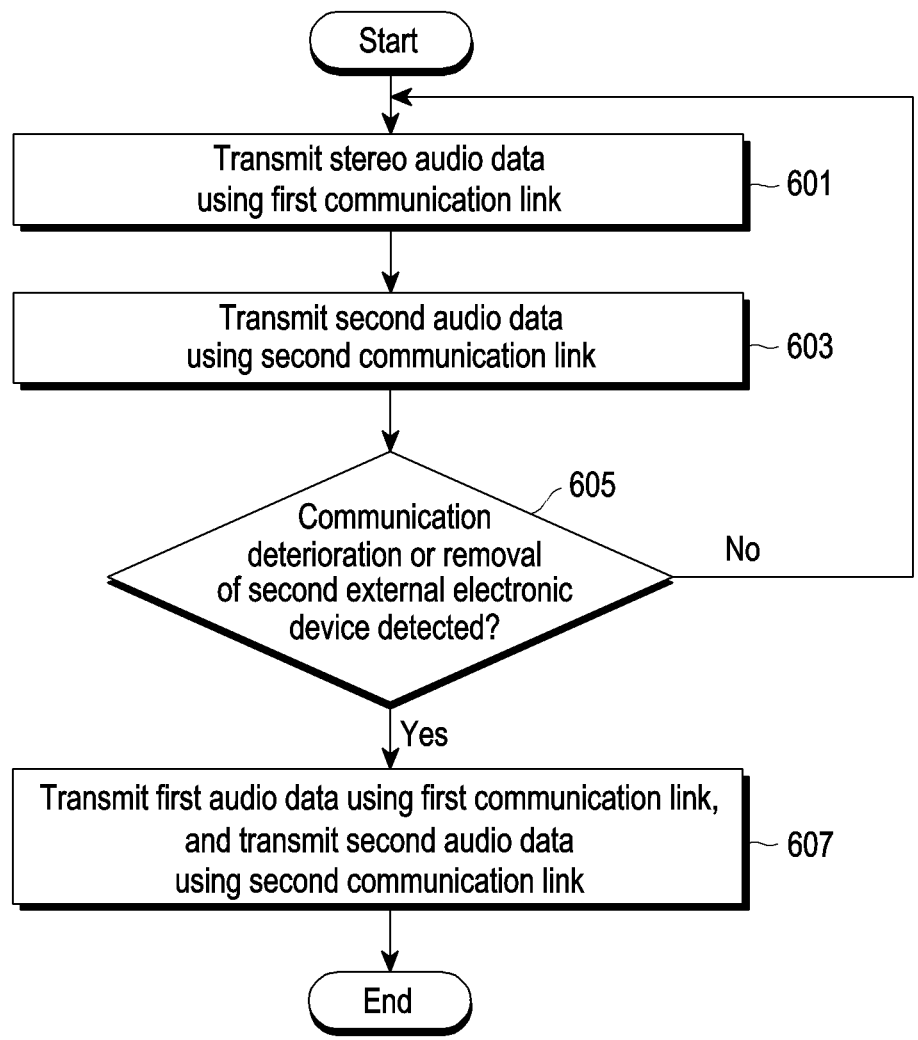
FIG. 6 is a flowchart illustrating an operation of an electronic device according to various example embodiments.

FIG. 6 is a flowchart of an operation of an electronic device according to various embodiments.

Referring to FIG. 6, according to various embodiments, in operation 601, an electronic device (e.g., the electronic device 201 of FIG. 2) may identify communication deterioration (or disconnection) of a second communication link, and then transmit stereo audio data (e.g., at least one stereo audio packet) (or at least one first audio packet and at least one second audio packet) to a first external electronic device (e.g., the first external electronic device 202 of FIG. 2), using a first communication link.

In an embodiment, when the second external electronic device 204 is not capable of a normal operation, for example, when the second external electronic device 204 is powered off or accommodated in a case (or cradle), the electronic device 201 may perform operation 601. In an embodiment, when the electronic device 201 detects that the second external electronic device 204 is not worn (e.g., when the electronic device 201 has received information (e.g., not worn) about a wearing state of the second external electronic device 204 from the first external electronic device 202 or the second external electronic device 204), or when the electronic device 201 recognizes that the second communication link may not be established with the second external electronic device 204 (e.g., when the second electronic device 204 suffers from communication deterioration or when the second external electronic device 204 is powered off or in an abnormal state), the electronic device 201 may perform operation 601.

According to various embodiments, in operation 603, after identifying the communication deterioration of the second communication link, the electronic device 201 may transmit second audio data (e.g., at least one second audio packet) to the second external electronic device (e.g., the second external electronic device 204 of FIG. 2A), using the second communication link. For example, the electronic device 201 may transmit a specified number of second audio packets to the second external electronic device 204 in order to identify the connection state (e.g., communication recovery or reconnection) of the second communication link. For example, the electronic device 201 may transmit at least one second audio packet to the second external electronic device 204 during a specified time (e.g., continuously, for a certain period of time, or once) in order to identify the connection state (e.g., communication recovery or reconnection) of the second communication link.

According to another embodiment, after identifying the communication deterioration of the second communication link, the electronic device 201 may transmit a specified packet (e.g., an empty packet) for identifying the connection state (e.g., communication recovery or reconnection) of the second communication link, instead of the second audio packet including the second audio data, to the second external electronic device 204, using the second communication link.

According to various embodiments, in operation 605, the electronic device 201 may identify whether an ACK signal corresponding to the second audio packet (or the specified packet) transmitted on the second communication link has been received from the second external electronic device 204. Upon receipt of the ACK signal corresponding to the second audio packet from the second external electronic device 204 (yes in operation 605), the electronic device 201 may proceed to operation 607. According to various embodiments, when the electronic device 201 has failed to receive the ACK signal corresponding to the second audio packet from the second external electronic device 204 (no in operation 605), the electronic device 201 may transmit stereo audio data (e.g., at least one stereo audio packet) (or at least one first audio packet and at least one second audio packet) to the first external electronic device 202, using the first communication link.

In various embodiments, in operation 605, the electronic device 201 may determine whether the second external electronic device 204 is capable of a normal operation (e.g., normal communication and audio output). In an embodiment, the electronic device 201 may identify that the second communication link has been reconnected and determine to proceed to operation 607. In an embodiment, the electronic device 201 may detect that the second external electronic device 204 has started a normal operation or has been worn by the user and determine to proceed to operation 607. In an embodiment, the electronic device 201 may receive information (e.g., worn) about a wearing state from the second external electronic device 204 and determine to proceed to operation 607.

According to various embodiments, in operation 607, the electronic device 201 may transmit first audio data (e.g., at least one first audio packet) to the first external electronic device 202 using the first communication link, and transmit second audio data (e.g., at least one second audio packet) to the second external electronic device 204 using the second communication link. For example, upon receipt of an ACK signal corresponding to the second audio packet from the second external electronic device 204, the electronic device 201 may determine that the second communication link is in a normal state. The electronic device 201 may discontinue transmitting the stereo audio data (or the second audio data) using the first communication link. For example, the electronic device 201 may transmit the first audio data to the first external electronic device 202 using the first communication link, and the second audio data to the second external electronic device 204 using the second communication link.

According to an embodiment, in operation 603, the electronic device 201 may transmit a separate packet (e.g., an empty packet) to the second external electronic device through the second communication link to identify whether the second communication link with the second external electronic device 204 is in the normal state. For example, the electronic device may transmit a packet for identifying the connection state of the second communication link to the second external electronic device 204 at a specified periodicity. The electronic device 201 may identify the connection state of the second communication link based on an ACK signal for the packet.

Figure 7A:
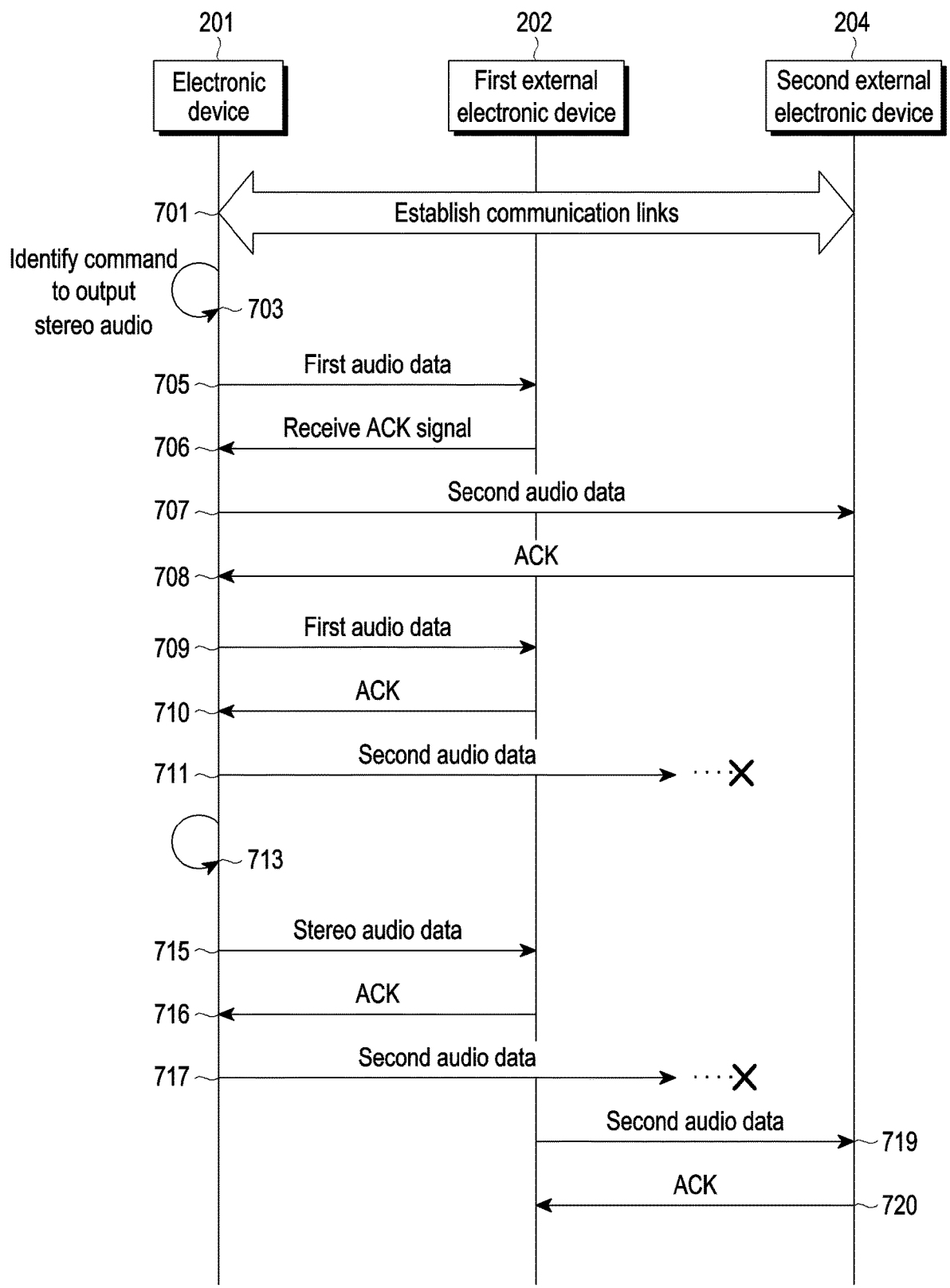
FIGS. 7A and 7B are diagrams illustrating a method of transmitting audio data to a plurality of external electronic devices by an electronic device according to various example embodiments.
Figure 7B:
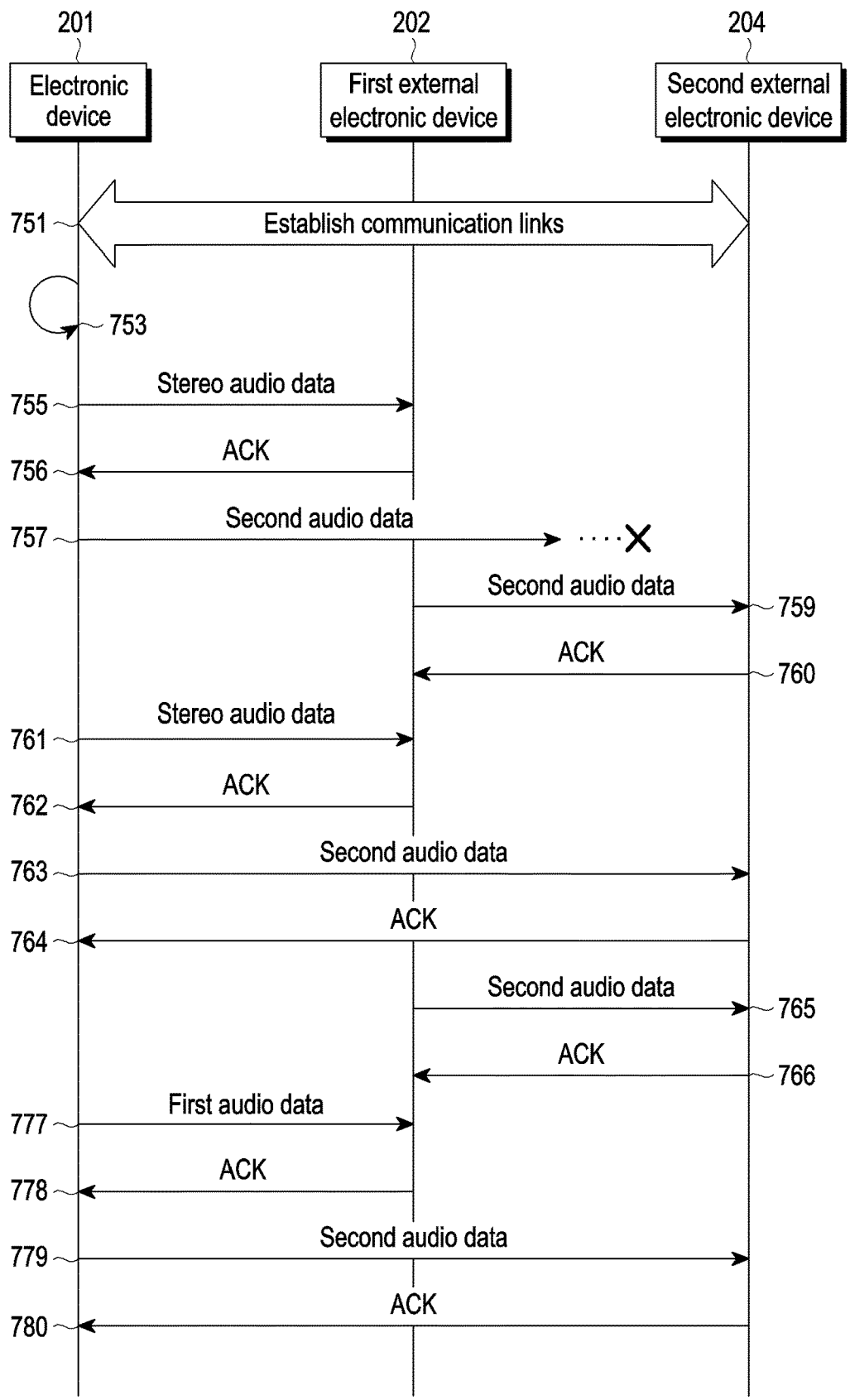

FIGS. 7A and 7B are diagrams illustrating a method of transmitting audio data to a plurality of external electronic devices by an electronic device according to various embodiments.

Referring to FIG. 7A, according to various embodiments, in operation 701, the electronic device 201 may establish a first communication link with the first external electronic device 202 and establish a second communication link with the second external electronic device 204. Further, the first external electronic device 202 may establish a third communication link with the second external electronic device 204.

According to various embodiments, in operation 703, the electronic device 201 may identify a command to output stereo audio. The electronic device 201 may obtain first audio data and second audio data for stereo audio data based on the command to output stereo audio. Further, the electronic device 201 may obtain a first audio packet including the first audio data and a second audio packet including the second audio data.

According to various embodiments, in operation 705, the electronic device 201 may transmit a first audio packet of a first time interval to the first external electronic device 202, using the first communication link. In operation 706, the electronic device 201 may receive an ACK signal corresponding to the first audio packet of the first time interval. In operation 707, the electronic device 201 may transmit a second audio packet of the first time interval to the second external electronic device 204, using the second communication link. In operation 708, the electronic device 201 may receive an ACK signal corresponding to the second audio packet of the first time interval.

According to various embodiments, in operation 709, the electronic device 201 may transmit a first audio packet of a second time interval to the first external electronic device 202, using the first communication link. In operation 710, the electronic device 201 may receive an ACK signal corresponding to the first audio packet of the second time interval. In operation 711, the electronic device 201 may transmit a second audio packet of the second time interval to the second external electronic device 204, using the second communication link. For example, the electronic device 201 may fail to receive an ACK signal corresponding to the second audio packet of the second time interval. For example, the failure to receive the ACK signal may include receiving a NACK signal after transmitting the first audio packet of the second time interval or no ACK signal within a specified time after transmitting the corresponding packet.

According to various embodiments, in operation 713, the electronic device 201 may identify communication deterioration of the second communication link based on the failure to receive the ACK signal corresponding to the second audio packet of the second time interval. For example, the electronic device 201 may identify communication deterioration of the second communication link based on the failure to receive the ACK signal corresponding to the second audio packet of the second time interval during a specified time or retransmission of the second audio packet of the second time interval a specified number of or more times.

According to various embodiments, in operation 713, the electronic device 201 may identify that the second communication link with the second external electronic device 204 has been disconnected. According to various embodiments, in operation 713, the electronic device 201 may identify that the second external electronic device 204 has been removed from the user's body.

According to various embodiments, in operation 715, the electronic device 201 may transmit a stereo audio packet of a third time interval to the first external electronic device 202, using the first communication link. For example, the stereo audio packet may include first audio data and second audio data of the third time interval. According to another embodiment, in operation 715, the electronic device 201 may sequentially transmit a first audio packet and a second audio packet of the third time interval to the first external electronic device 202, using the first communication link. In operation 716, the electronic device 201 may receive an ACK signal corresponding to the stereo audio packet of the third time interval.

According to another embodiment, in operation 715, the electronic device 201 may transmit a stereo audio packet including stereo audio data of the second time interval to the first external electronic device 202, using the first communication link. In this case, the stereo audio packet may include the first audio data and the second audio data of the second time interval. For example, when reception buffers of the first external electronic device 202 and the second external electronic device 204 may store up to 300 ms of audio data, and the communication deterioration of the second communication link lasts for up to 150 ms, the electronic device 201 may transmit the stereo audio packet including the first audio data and the second audio data of the second time interval during the third time interval. On the contrary, when the communication deterioration of the second communication link lasts for 300 ms or longer, the electronic device 201 may give up retransmission of the second audio data of the second time interval, and transmit a stereo audio packet including stereo audio data of the third time interval.

According to various embodiments, in operation 717, the electronic device 201 may transmit the second audio packet (or empty packet) of the third time interval to the second external electronic device 204, using the second communication link to identify the connection state of the second communication link.

According to various embodiments, the first external electronic device 202 may generate the second audio packet of the third time interval based on the second audio data included in the stereo audio packet. According to another embodiment, the first external electronic device 202 may receive the second audio packet of the third time interval from the electronic device 201. In operation 719, the first external electronic device 202 may transmit (or forward) the second audio packet of the third time interval to the second external electronic device 204, using the third communication link. In operation 720, the first external electronic device 202 may receive an ACK signal corresponding to the second audio packet of the third time interval from the second external electronic device 204.

Therefore, the electronic device 201 may transmit the second audio packet to the second external electronic device 204 through the first external electronic device 202, in spite of communication deterioration (or disconnection) of the second communication link.

Referring to FIG. 7B, according to various embodiments, in operation 751, the electronic device 201 may establish the first communication link with the first external electronic device 202, and establish the second communication link with the second external electronic device 204. In an embodiment, the first external electronic device 202 may establish the third communication link with the second external electronic device 204.

According to various embodiments, in operation 753, the electronic device 201 may identify that communication deterioration (or disconnection) has occurred to the second communication link before a fourth time interval. According to various embodiments, in operation 753, the electronic device 201 may identify that the second external electronic device 204 has been removed before the fourth time interval.

According to various embodiments, in operation 755, the electronic device 201 may transmit a stereo audio packet of the fourth time interval to the first external electronic device 202, using the first communication link. For example, the stereo audio packet may include first audio data and second audio data of the fourth time interval. Alternatively, the electronic device 201 may sequentially transmit a first audio packet and a second audio packet of the fourth time interval to the first external electronic device 202, using the first communication link. In operation 756, the electronic device 201 may receive an ACK signal corresponding to the stereo audio packet of the fourth time interval.

According to various embodiments, in operation 757, the electronic device 201 may transmit the second audio packet of the fourth time interval to the second external electronic device 204, using the second communication link in order to identify the connection state of the second communication link. According to an embodiment, the electronic device 201 may fail to receive an ACK signal to the second audio packet of the fourth time interval transmitted using the second communication link from the second external electronic device 204 due to the communication deterioration of the second communication link.

According to another embodiment, the electronic device 201 may apply various methods to identify that the second communication link with the second external electronic device has been recovered from the communication deterioration state to the normal state. For example, the electronic device 201 may transmit a packet (e.g., an empty packet) for identifying the connection state of the second communication link to the second external electronic device 204, instead of the second audio packet. Alternatively, the second external electronic device 204 may autonomously determine the connection state (communication recovery or reconnection) of the second communication link, and transmit information about the connection state of the second communication link to the electronic device 201 directly or through the first external electronic device 202.

According to various embodiments, the first external electronic device 202 may generate the second audio packet of the fourth time interval based on the second audio data included in the stereo audio packet. According to another embodiment, the first external electronic device 202 may receive the second audio packet of the fourth time interval from the electronic device 201. In operation 759, the first external electronic device 202 may transmit (or forward) the second audio packet of the fourth time interval to the second external electronic device 204, using the third communication link. In operation 760, the first external electronic device 202 may receive an ACK signal corresponding to the second audio packet of the fourth time interval from the second external electronic device 204.

According to various embodiments, in operation 761, the electronic device 201 may transmit a stereo audio packet of a fifth time interval to the first external electronic device 202, using the first communication link. According to another embodiment, the electronic device 201 may sequentially transmit a first audio packet and a second audio packet of the fifth time interval to the first external electronic device 202, using the first communication link. In operation 762, the electronic device 201 may receive an ACK signal corresponding to the stereo audio packet of the fifth time interval.

According to various embodiments, in operation 763, the electronic device 201 may transmit the second audio packet of the fifth time interval to the second external electronic device 204, using the second communication link in order to identify the connection state of the second communication link. In operation 764, the electronic device 201 may receive an ACK signal corresponding to the second audio packet of the fifth time interval from the second external electronic device 204. For example, the electronic device 201 may determine that the second communication link is in the normal state based on the reception of the ACK signal corresponding to the second audio packet of the fifth time interval from the second external electronic device 204. In an embodiment, the electronic device 201 may determine that the second communication link has been recovered to the normal state based on reception of an ACK signal corresponding to at least one second audio packet of at least one consecutive or non-consecutive time interval (e.g., including the fifth time interval) from the second external electronic device 204.

According to various embodiments, instead of operations 763 and 764, the electronic device 201 may identify that the second communication link with the second external electronic device 204 has been reconnected and determine to perform operation 779. According to various embodiments, instead of operations 763 and 764, the electronic device 201 may identify that the second external electronic device 204 is worn on the user's body again and determine to perform operation 779.

According to various embodiments, in operation 765, the first external electronic device 202 may transmit (or forward) the second audio packet of the fifth time interval to the second external electronic device 204, using the second communication link. In operation 766, the first external electronic device 202 may receive an ACK signal corresponding to the second audio packet of the fifth time interval. However, since the second audio packet of the fifth time interval has already been received by the second external electronic device 204 in operation 763, the second external electronic device 204 may discard or ignore the second audio packet of the fifth time interval received from the first external electronic device 202.

According to various embodiments, in operation 777, the electronic device 201 may transmit a first audio packet of a sixth time interval to the first external electronic device 202, using the first communication link. For example, since the electronic device 201 identifies that the communication deterioration of the second communication link has been overcome in operation 764, the electronic device 201 may discontinue transmitting stereo audio data (or second audio data) using the first communication link. In operation 778, the electronic device 201 may receive an ACK signal corresponding to the first audio packet of the sixth time interval. In operation 779, the electronic device 201 may transmit a second audio packet of the sixth time interval to the second external electronic device 204, using the second communication link. In operation 780, the electronic device 201 may receive an ACK signal corresponding to the second audio packet of the sixth time interval.

Figure 8:
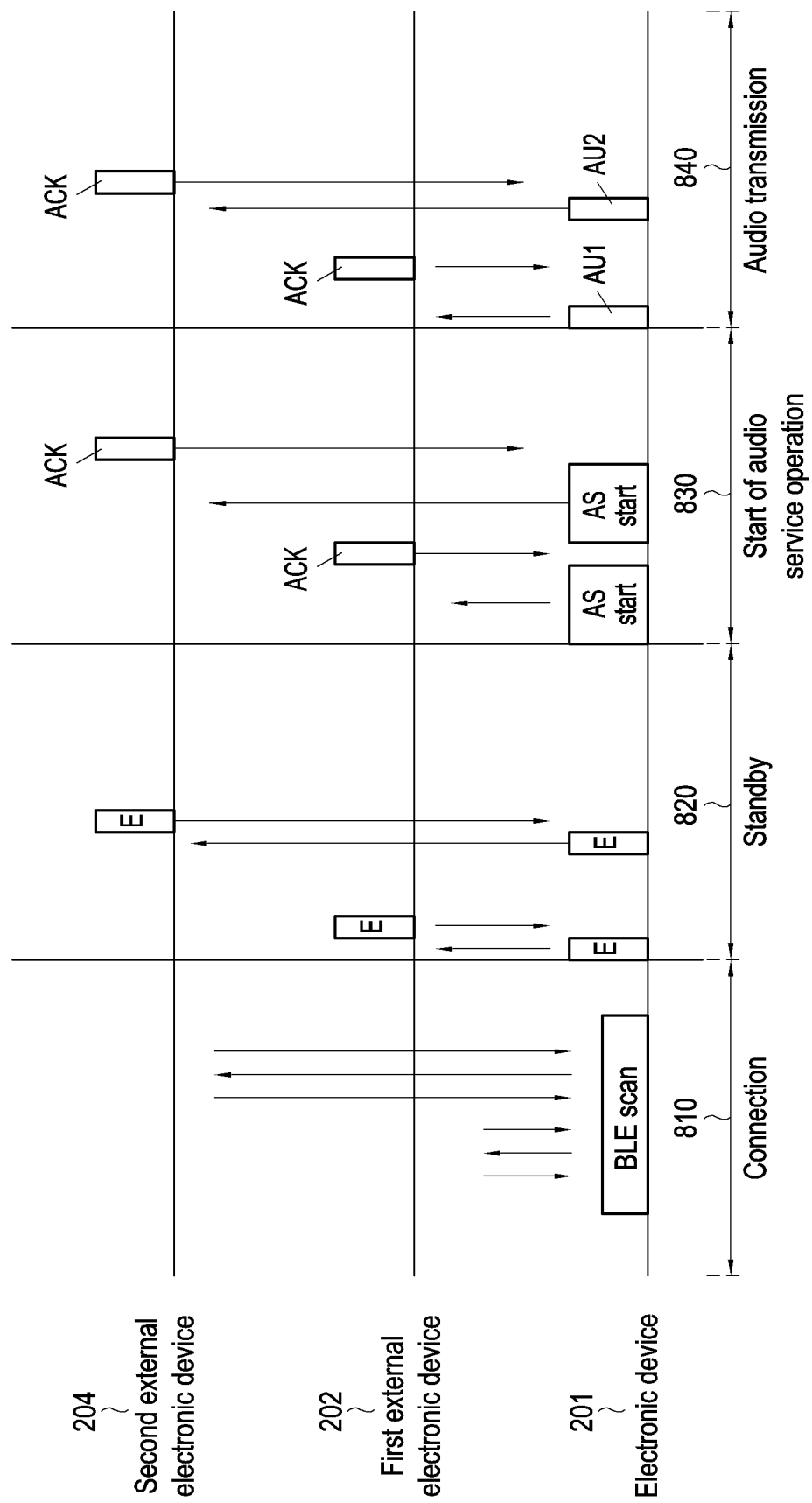
FIG. 8 is a diagram illustrating a method of transmitting audio data to a plurality of external electronic devices by an electronic device according to various example embodiments.

FIG. 8 is a diagram illustrating a method of transmitting audio data to a plurality of external electronic devices by an electronic device according to various embodiments.

According to various embodiments, in operation 810, the electronic device 201 may perform an operation of connecting to each of external electronic devices (e.g., the external electronic devices 202 and 204 of FIG. 2A). For example, the electronic device 201 may establish a communication link with each of the external electronic devices 202 and 204 by the BLE communication technology or the WiFi communication technology.

For example, when the BLE communication technology is used, the electronic device 201 may perform a BLE scan operation, receive an advertisement signal from the first external electronic device 202, and establish a first communication link with the first external electronic device 202 based on the received advertisement signal. In addition, the electronic device 201 may perform a BLE scan operation, receive an advertisement signal from the second external electronic device 204, and establish a second communication link with the second external electronic device 204 based on the received advertisement signal.

The electronic device 201 may identify an audio channel role of each of the external electronic devices 202 and 204, while establishing the communication link with each of the external electronic devices 202 and 204. For example, the electronic device 201 may identify that the first electronic device 202 corresponds to the first audio channel (e.g., the right (R) channel) based on a signal (e.g., the advertisement signal) received from the first external electronic device 202. In addition, the electronic device 201 may identify that the second electronic device 204 corresponds to the second audio channel (e.g., the left (L) channel) based on a signal (e.g., the advertisement signal) received from the second external electronic device 204. According to an embodiment, the electronic device 201 may identify the audio channel role of each of the external electronic devices 202 and 204 after establishing the communication link with each of the external electronic devices 202 and 204.

According to an embodiment, before the first external electronic device 202 and the second external electronic device 204 establish the communication links (e.g., the first link and the second link of FIG. 2A) with the electronic device 201, they may establish a communication link (e.g., the third link in FIG. 2A) between them. According to an embodiment, before the first external electronic device 202 and the second external electronic device 204 establish the communication links with the electronic device 201, their respective audio channel roles may be determined.

According to various embodiments, in operation 820, the electronic device 201 may perform an operation in a standby state, while maintaining the communication link with each of the external electronic devices 202 and 204. For example, the standby state is a state in which the electronic device 201 has established the communication link (e.g., a BLE link) with each of the external electronic devices 202 and 204, and operates while independently maintaining the connection to each of the external electronic devices 202 and 204. The electronic device 201 may set a time interval for transmitting audio data through the communication link (e.g., the BLE link) of each of the external electronic devices 202 and 204. For example, the electronic device 201 may set a first time (a first sub-interval) for transmitting a first audio packet to the first external electronic device 202 through the first communication link, and set a second time (a second sub-interval) for transmitting a second audio packet to the second external electronic device 204 through the second communication link, within a first time interval (e.g., an isochronous (ISO) interval).

According to various embodiments, in operation 830, the electronic device 201 may perform an operation of starting a stereo audio service. The step of starting the stereo audio service may indicate a period in which a synchronized AoBLE service is to be started on the communication link of each of the external electronic devices 202 and 204. Then, when the AoBLE service is opened, the electronic device 201 may transmit a packet indicating that stereo audio output starts (e.g., an audio service (AS) start packet) to the external electronic devices 202 and 204, respectively. For example, the packet indicating the start of stereo audio output may include parameters for an output delay value, a packet type, and an interval for each of the external electronic devices 202 and 204 which may be synchronized.

The electronic device 201 may generate first audio data (e.g., a first audio packet) and second audio data (e.g., a second audio packet data) for stereo audio data based on the respective audio channel roles of the external electronic devices 202 and 204. The first audio data may be mono audio data corresponding to the first audio channel (e.g., the right audio channel), and the second audio data may be mono audio data corresponding to the second audio channel (e.g., the left audio channel).

According to various embodiments, in operation 840, the electronic device 201 may transmit the audio data to the external electronic devices 202 and 204, respectively. For example, the electronic device 201 may transmit the first audio packet (e.g., audio unit 1 (AU1)) including the first audio data to the first external device 202, using the first communication link, and the second audio packet (e.g., audio unit 2 (AU2)) including the second audio data to the second external electronic device 204, using the second communication link, during each specified time interval. The electronic device 201 may receive an ACK signal corresponding to the first audio packet from the first external electronic device 202 through the first communication link during each specified time interval, and receive an ACK signal corresponding to the second audio packet from the second external electronic device 204 through the first communication link during each specified time interval.

Figure 9:
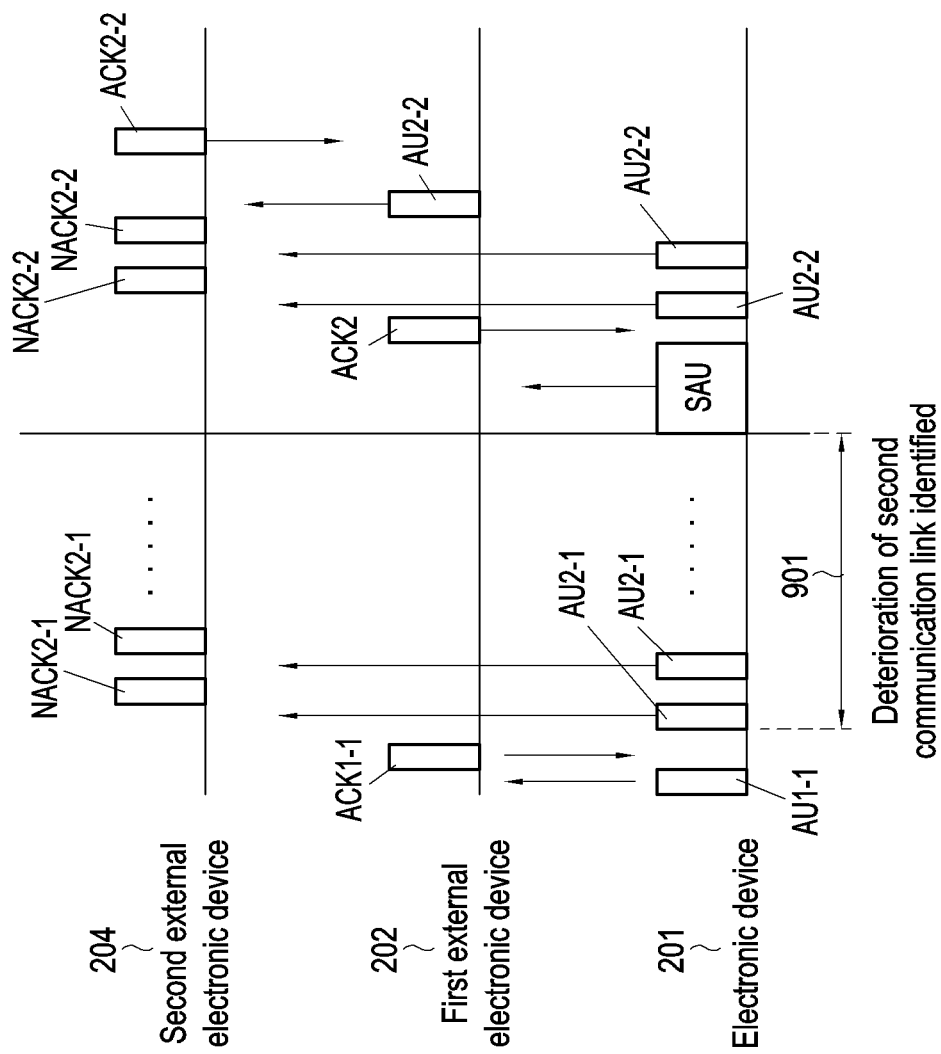
FIGS. 9 and 10 are diagrams illustrating a method of transmitting stereo audio data to a first external electronic device by an electronic device according to various example embodiments.
Figure 10:
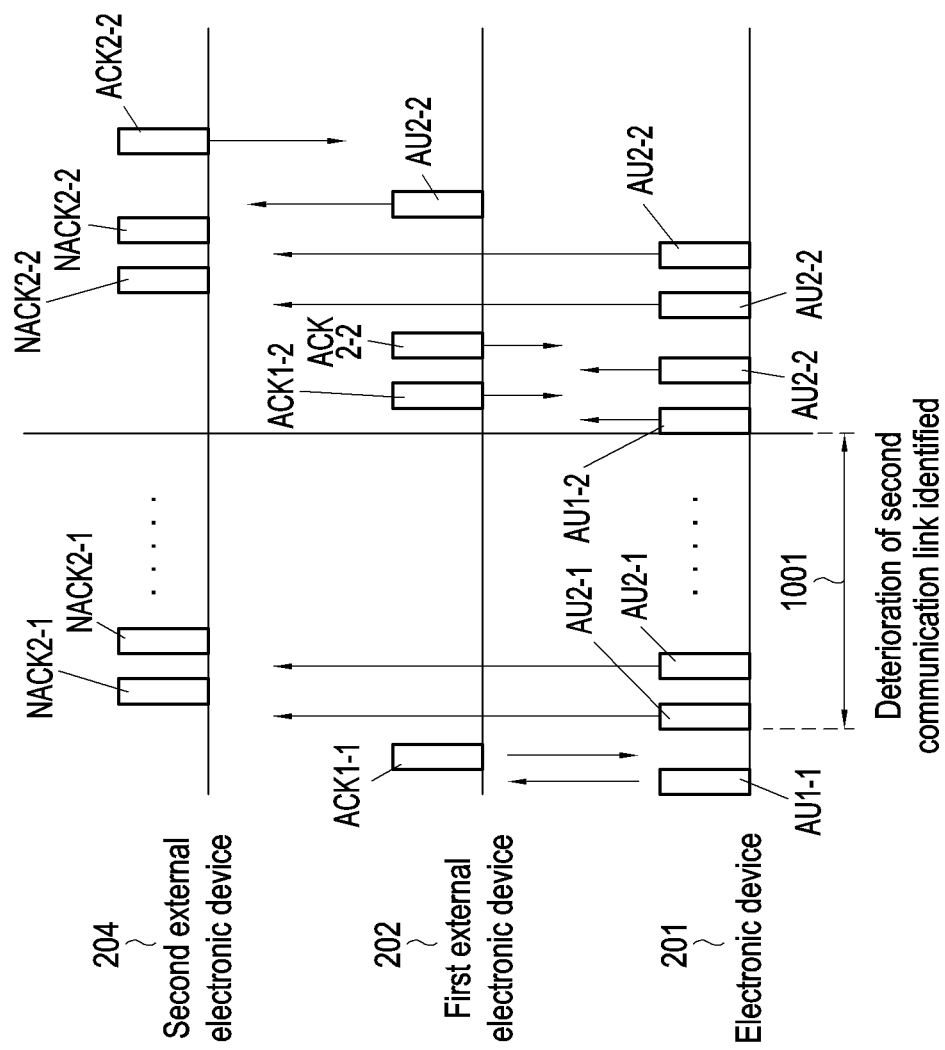

FIGS. 9 and 10 are diagrams illustrating a method of transmitting stereo audio data to a first external electronic device by an electronic device according to various embodiments.

Referring to FIG. 9, the electronic device 201 may transmit a first audio packet AU1-1 of a first time interval the first external electronic device 202, using the first communication link. The electronic device 201 may receive an ACK ACK1-1 corresponding to the first audio packet AU1-1 of the first time interval. The electronic device 201 may transmit a second audio packet AU2-1 of the first time interval to the second external electronic device 204, using the second communication link. In an embodiment, when the second communication link is in a communication deterioration state (901), the electronic device 201 may fail to receive an ACK signal corresponding to the second audio packet AU2-1 of the first time interval from the second external electronic device 204. For example, when the second communication link is in the communication deterioration state (901), the second external electronic device 204 may fail to receive the second audio packet AU2-1 of the first time interval from the electronic device 201. In another example, when the second communication link is in the communication deterioration state (901), the electronic device 201 may fail to receive an ACK signal ACK2-1 corresponding to the second audio packet AU2-1 of the first time interval from the second external electronic device 204. In another example, when the second communication link is in the communication deterioration state (901), the electronic device 201 may receive a NACK signal NACK2-1 corresponding to the second audio packet AU2-1 of the first time interval from the second external electronic device 204.

According to various embodiments, the electronic device 201 may identify that the communication deterioration has occurred to the second communication link, based on the failure to receive the ACK signal corresponding to the second audio packet AU2-1 of the first time interval from the second external electronic device 204 or the reception of the NACK signal corresponding to the second audio packet AU1-2 of the first time interval (901). In an embodiment, the electronic device 201 may identify the communication deterioration of the second communication link based on at least one of various indicators such as a bit rate, a received signal strength, or a QoS setting (901). In an embodiment, the electronic device 201 may identify the communication deterioration of the second communication link based on retransmission of a specified number of second audio packets AU2-1 of the first time interval and failure to receive an ACK signal to the retransmission from the second external electronic device 204 (901). In an embodiment, the electronic device 201 may identify the occurrence of communication deterioration of the second communication link based on retransmission of the second audio packet AU2-1 of the first time interval during a preset time and failure to receive an ACK signal to the retransmission from the second external electronic device 204 (901).

In an embodiment, the electronic device 201 may identify the communication deterioration of the second communication link based on transmission of at least one audio packet including second audio data according to a preset number or during a preset time, and failure to receive at least one ACK signal corresponding to the transmission from the second external electronic device 204 (901). In an embodiment, the electronic device 201 may identify the communication deterioration of the second communication link based on transmission of at least one audio packet including second audio data in consecutive or non-consecutive time intervals according to a preset number or during a specified time in consecutive or non-consecutive time intervals, and reception of NACK signal(s) corresponding to the transmission from the second external electronic device 204 (901).

According to various embodiments, the electronic device 201 may transmit a stereo audio packet (e.g., a stereo audio unit (SAU)) of a second time interval to the first external electronic device 202, using the first communication link in response to the identification of communication deterioration of the second communication link (901). For example, the electronic device 201 may transmit the stereo audio packet (SAU) in a first sub-interval of the second time interval. For example, the stereo audio packet (SAU) may include first audio data and second audio data of the second time interval. The electronic device 201 may receive an ACK signal ACK2 corresponding to the stereo audio packet (SAU) of the second time interval from the first external electronic device 202. The ACK signal ACK2 may be received through the first communication link, for example.

According to another embodiment, the electronic device 201 may transmit a stereo audio packet including first audio data and second audio data of the first time interval to the first external electronic device 202, using the first communication link. For example, when a preset time has not elapsed after the second external electronic device 204 failed to receive the second audio packet AU2-1 of the first time interval, the electronic device 201 may transmit the stereo audio packet including the first audio data and the second audio data of the first time interval to the first external electronic device 202. According to another embodiment, when the preset time has elapsed after the second external electronic device 204 failed to receive the second audio packet AU2-1 of the first time interval, the electronic device 201 may transmit the stereo audio packet (SAU) including the first audio data and the second audio data of the second time interval to the first external electronic device 202.

According to various embodiments, to identify the connection state of the second communication link, the electronic device 201 may transmit the second audio packet AU2-2 of the second time interval to the second external electronic device 204, using the second communication link. For example, the electronic device 201 may transmit the stereo audio packet (SAU) to the first external electronic device 202 in a time interval (for example, a sub-interval) allocated to the first communication link within the second time interval, and transmit the second audio packet AU2-2 of the second time interval to the second external electronic device 204 at least once (e.g., twice) in a time interval (e.g., a sub-interval) allocated to the second communication link within the second time interval.

According to various embodiments, the first external electronic device 202 may obtain the second audio packet AU2-2 of the second time interval based on the second audio data included in the stereo audio packet, and transmit the second audio packet AU2-2 of the second time interval to the second external electronic device 204, using the third communication link. According to an embodiment, the first external electronic device 202 may transmit the second audio packet AU2-2 of the second time interval to the second external electronic device 204 through the third communication link in a time interval that does not overlap with the time at which the electronic device 201 transmits the first audio data and/or the stereo audio packet (SAU) to the first external electronic device 202 and/or the time at which the electronic device 201 transmits the second audio data to the second external electronic device 204. In an embodiment, the second external electronic device 204 may transmit an ACK signal ACK2-2 corresponding to the second audio packet AU2-2 of the second time interval to the first external electronic device 202 through the third communication link.

In various embodiments, the transmission of the second audio data by the first external electronic device 202 may be selectively performed. In an embodiment, when the first external electronic device 202 has received a stereo audio packet (e.g., SAU) from the electronic device 201, and a given condition is satisfied, the first external electronic device 202 may determine to transmit a second audio packet (e.g., AU2-2) including second audio data obtained from the stereo audio packet to the second external electronic device 204 through the third communication link. In an embodiment, the given condition may include identification of normal operation (e.g., good communication) of the third communication link when the third communication link has been established with the second external electronic device 204, and/or non-reception of a notification signal indicating abnormal operation of the second external electronic device 204 (e.g., disconnection of the second communication link or non-wearing of the second external electronic device 204) from the second external electronic device 204 or the electronic device 201.

In an embodiment, even if the first external electronic device 202 has received the stereo audio packet from the electronic device 201, when the given condition is not satisfied (e.g., when establishment of the third communication with the second external electronic device 204 has been failed, when the connection state of the third communication link with the second external electronic device 204 is not good, or when a notification signal indicating disconnection or removal of the second external electronic device 204 has been received from the second external electronic device 204 or the electronic device 201), the first external electronic device 202 may not transmit the second audio data obtained from the stereo audio packet to the second external electronic device 204 through the third communication link. In an embodiment, when the first external electronic device 202 does not transmit the second audio data to the second external electronic device 204 through the third communication link, the first external electronic device 202 may perform a third operation for outputting the stereo audio including the first audio data and the second audio data received from the electronic device 201. In an embodiment, the third operation may include generating the stereo audio by mixing the first audio data and the second audio data, and outputting the stereo audio through the first speaker 274.

Referring to FIG. 10, the electronic device 201 may transmit first audio data and second audio data to the first external electronic device 202 during a preset time after identifying communication deterioration of the second communication link (1001).

According to various embodiments, compared to FIG. 9, the electronic device 201 may sequentially transmit the first audio packet AU1-2 including the first audio data of the second time interval and the second audio packet AU2-2 including the second audio data of the second time interval to the first electronic device 202 in response to the identification of the communication deterioration of the second communication link (1001). The first external electronic device 202 may forward the second audio packet AU2-2 received from the electronic device 201 to the second external electronic device 204, using the third communication link. The first external electronic device 202 may transmit ACK signals ACK1-2 and ACK2-2 corresponding respectively to the first and second audio packets AU1-2 and AU2-2 of the second time interval to the electronic device 201 through the first communication link.

In an embodiment, when the first external electronic device 202 has received the second audio packet (e.g., AU2-2) together with the first audio packet (e.g., AU1-2) from the electronic device 201, and a given condition is satisfied, the first external electronic device 202 may determine to transmit the second audio packet to the second external electronic device 204 through the third communication link. In an embodiment, the given condition may include detection of normal operation (e.g., good communication) of the third communication link, when the third communication link has been established with the second external electronic device 204 and/or non-reception of a notification signal indicating abnormal operation of the second external electronic device 204 (e.g., disconnection of the second communication link or non-wearing of the second external electronic device 204) from the second external electronic device 204 or the electronic device 201.

In an embodiment, even if the first external electronic device 202 has received the second audio packet from the electronic device 201, when the given condition is not satisfied (e.g., when the communication state of the third communication link with the second external electronic device 204 is not good, or when the notification signal indicating disconnection or non-wearing of the second external electronic device 204 has been received from the second external electronic device 204 or the electronic device 201), the first external electronic device 202 may not transmit the second audio packet to the second external electronic device 204 through the third communication link. In an embodiment, when the first external electronic device 202 does not transmit the second audio packet to the second external electronic device 204 through the third communication link, the first external electronic device 202 may perform the third operation for outputting the stereo audio including the first audio data and the second audio data received from the electronic device 201 through the first speaker 274.

Figure 11:
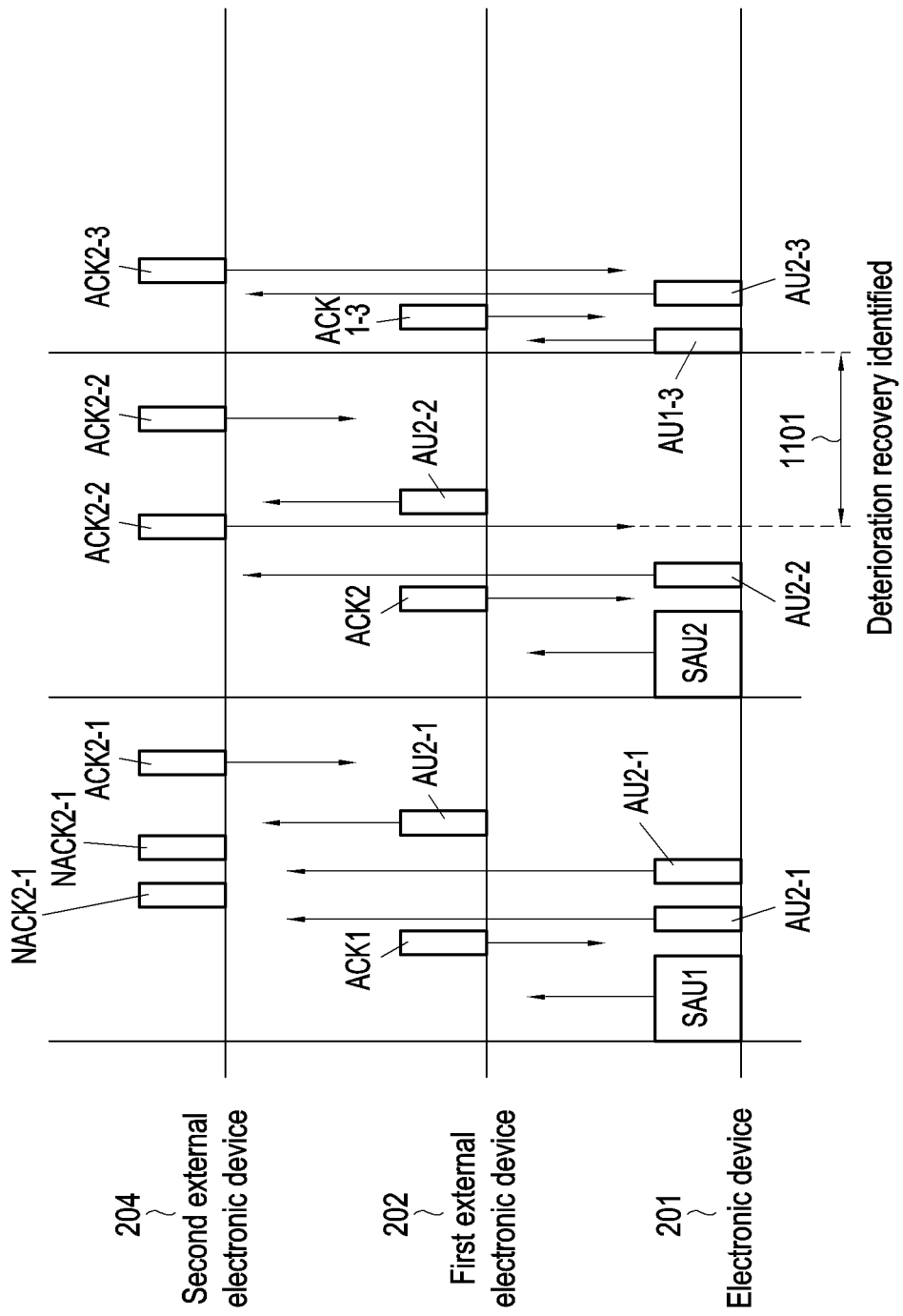
FIG. 11 is a diagram illustrating a method of transmitting audio data to a plurality of external electronic devices by an electronic device according to various example embodiments.

FIG. 11 is a diagram illustrating a method of transmitting audio data to a plurality of external electronic devices by an electronic device according to various embodiments.

Referring to FIG. 11, the electronic device 201 may transmit a stereo audio packet SAU1 of a first time interval to the first external electronic device 202, using the first communication link, based on occurrence of communication deterioration of the second communication link. For example, the stereo audio packet SAU1 may include first audio data and second audio data of the first time interval. In an embodiment, the electronic device 201 may transmit a second audio packet AU2-1 of the first time interval to the second external electronic device 204 at least once (e.g., twice), using the second communication link, to identify the connection state of the second communication link. The second external electronic device 204 may fail to successfully receive the second audio packet AU2-1 of the first time interval from the electronic device 201 due to the communication deterioration of the second communication link. In an embodiment, the second external electronic device 204 may transmit a NACK signal NACK2-1 corresponding to the second audio packet AU2-1 of the first time interval to the electronic device 201 at least once (e.g., twice).

According to various embodiments, the first external electronic device 202 may obtain the second audio packet AU2-1 of the first time interval based on the second audio data included in the stereo audio packet SAU1 of the first time interval. The first external electronic device 202 may transmit the second audio packet AU2-1 of the first time interval to the second external electronic device 204, using the third communication link.

According to various embodiments, the electronic device 201 may transmit a stereo audio packet SAU2 of a second time interval to the first external electronic device 202, using the first communication link. In addition, the electronic device 201 may transmit a second audio packet AU2-2 of the second time interval to the second external electronic device 204 at least once (e.g., twice), using the second communication link in order to identify the connection state of the second communication link. In an embodiment, when the second communication link is out of the communication deterioration state (1101), the electronic device 201 may receive at least one ACK signal ACK2-2 corresponding to the second audio packet AU2-2 of the second time interval from the second external electronic device 204. For example, the electronic device 201 may determine that the second communication link has been recovered from the communication deterioration to the normal state based on the reception of a preset number of ACK signals (e.g., ACK2-2) corresponding to the second audio data (1101).

According to various embodiments, the first external electronic device 202 may transmit the second audio packets AU2-1 and AU2-2 of the first time interval and the second time interval to the second external electronic device 204, using the third communication link during the first time interval and the second time interval. Since the second external electronic device 204 has already received the second audio packet AU2-2 of the second time interval from the electronic device 201, the second external electronic device 204 may transmit an ACK signal for the second audio packet AU2-2 of the second time interval to the first external electronic device 202, and discard or ignore the second audio packet AU2-2 of the second time interval received from the first external electronic device 202.

According to various embodiments, the electronic device 201 may transmit a first audio packet AU1-3 of a third time interval to the first external electronic device 202, using the first communication link. The electronic device 201 may transmit a second audio packet AU2-3 of the third time interval to the second external electronic device 204, using the second communication link. That is, since the communication deterioration of the second communication link has been overcome, the electronic device 201 may not transmit a stereo audio packet to the first external electronic device 202 using the first communication link during the third time interval.

For convenience of description, embodiments in which the electronic device 201 is connected, directly or indirectly, to the two external electronic devices 202 and 204 and transmits audio data have been described above, to which the technical idea may not be limited.

According to various embodiments, the electronic device 201 may be connected to two or more external electronic devices. For example, the electronic device may provide a 5.1CH audio service by connecting to six or more external electronic devices. To provide the 5.1CH audio service, the electronic device 201 may identify audio channel roles (e.g., left, right, center, left rear, right rear, and bass) of the respective external electronic devices, and transmit mono audio packets to the respective external electronic devices. When failing to receive an ACK signal from or identifying a communication deterioration state (or disconnection) of one (e.g., left) of the plurality of external electronic devices, the electronic device 201 may transmit a multi-channel audio packet (e.g., a stereo audio packet) to at least one other external electronic device (e.g., center).

Figure 12:
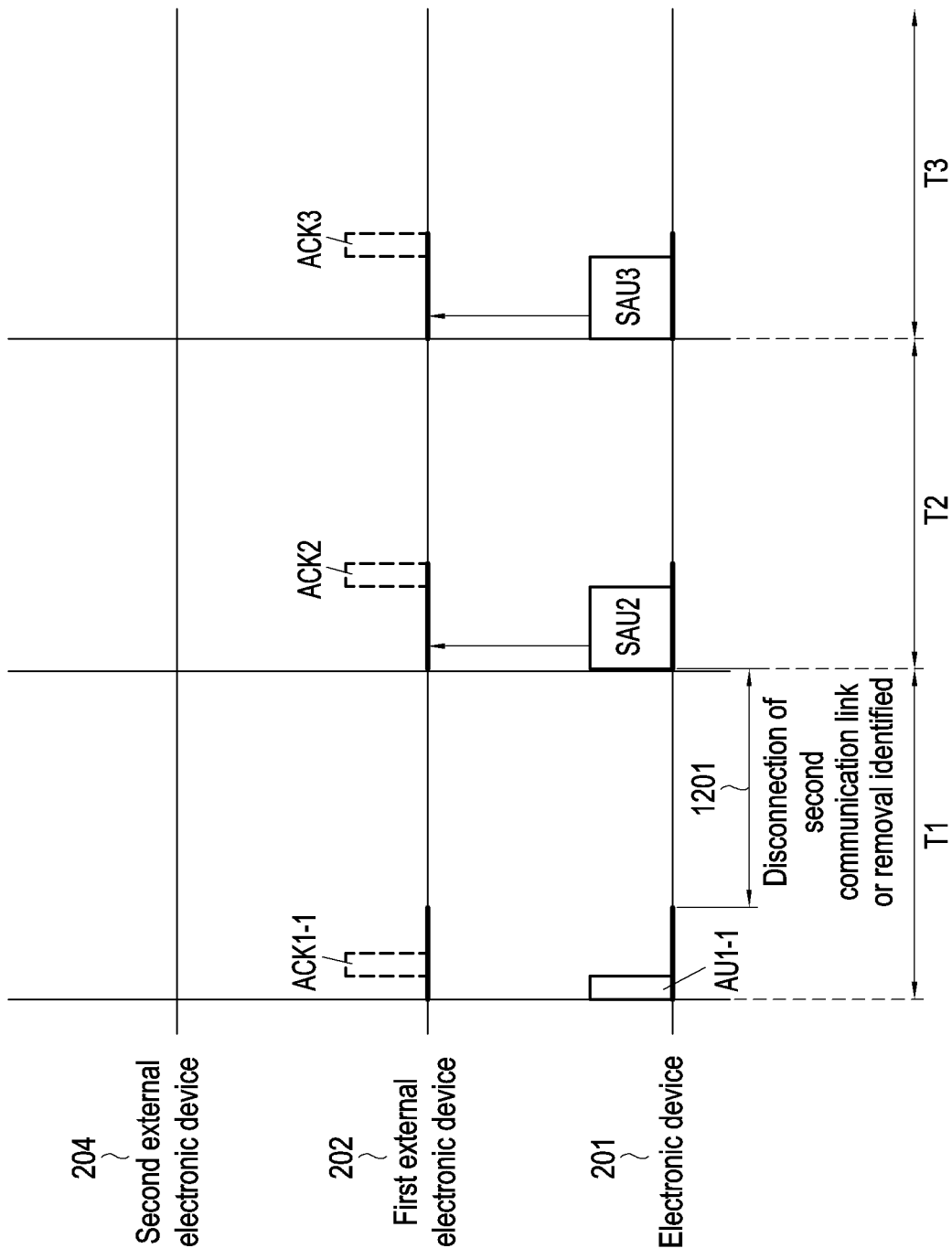
FIGS. 12 and 13 are diagrams illustrating transmission of stereo audio data, when an external electronic device is disconnected according to various example embodiments.
Figure 13:
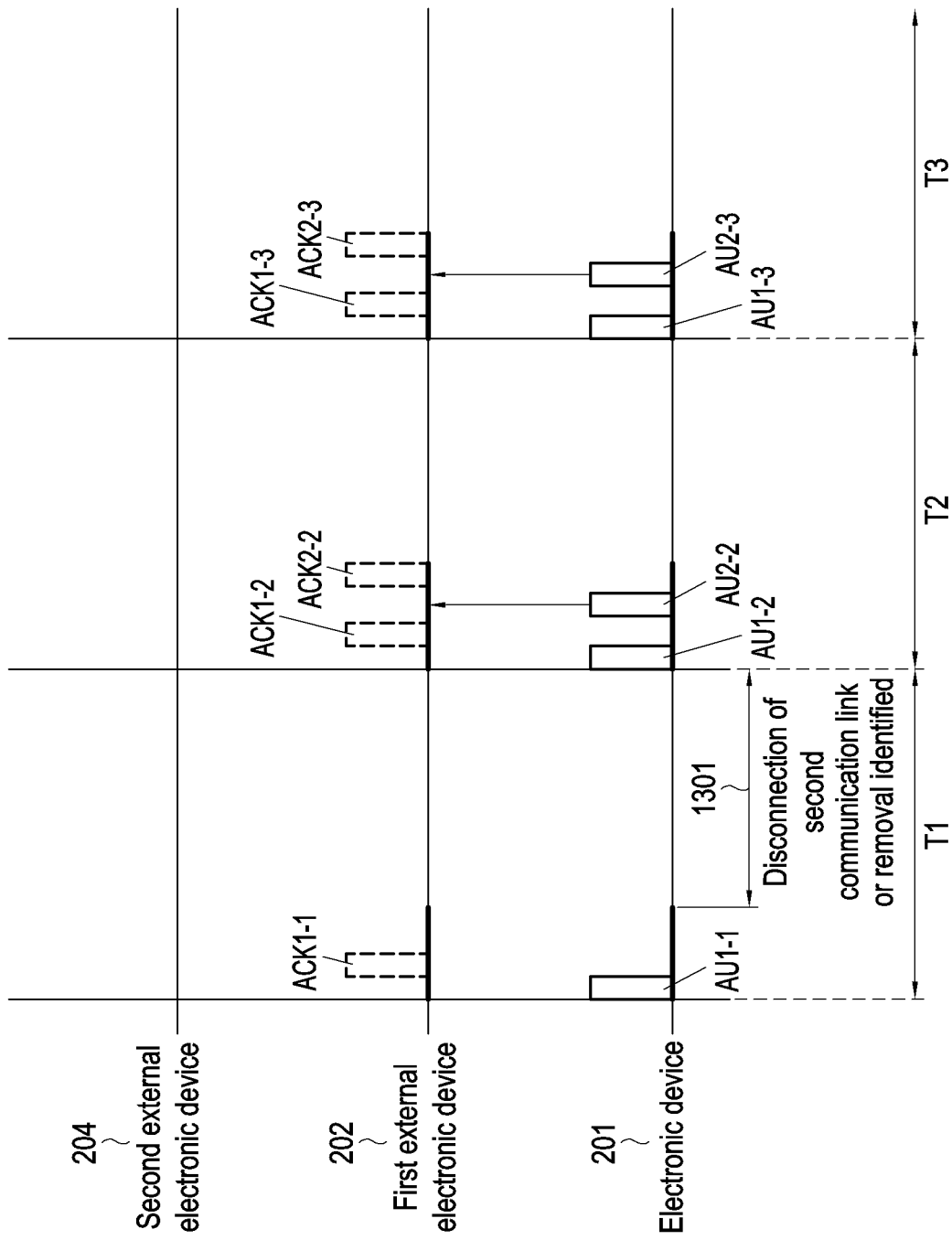

FIGS. 12 and 13 are diagrams illustrating transmission of stereo audio data, when an external electronic device is disconnected according to various embodiments.

Referring to FIG. 12, the electronic device 201 may transmit the first audio packet AU1-1 of the first time interval T1 to the first external electronic device 202, using the first communication link. The electronic device 201 may receive the ACK signal ACK1-1 corresponding to the first audio packet AU1-1 of the first time interval T1 from the first external electronic device 202. In the first time interval T1, the electronic device 201 may identify disconnection or removal of the second external electronic device 204 (1201). According to an embodiment, the electronic device 201 may identify that the second communication link with the second external electronic device 204 has been disconnected in the first time interval T1. In an embodiment, the second communication link may be deteriorated or disconnected. In an embodiment, the electronic device 201 may identify the removal of the second external electronic device 204 by receiving information (e.g., not worn) about a wearing state from the second external electronic device 204 within or before the first time interval.

The electronic device 201 may transmit at least one stereo audio packet including first audio data and second audio data through the first communication link during at least one time interval (e.g., T2 and T3) corresponding to a preset time after the first time interval T1, in response to the detection (1201) of the disconnection or non-wearing of the second external electronic device 204. In an embodiment, the electronic device 201 may transmit the stereo audio packet SAU2 of the second time interval T2 to the first external electronic device 202, using the first communication link in the second time interval T2, in response to the detection of the disconnection of the second communication link in the first time interval T1. For example, the electronic device 201 may transmit the stereo audio packet SAU2 in a first sub-interval of the second time interval T2. In an embodiment, the stereo audio packet SAU2 may include the first audio data and the second audio data of the second time interval T2. The electronic device 201 may receive the ACK signal ACK2 corresponding to the stereo audio packet SAU2 of the second time interval T2 from the first external electronic device 202.

In another embodiment, the electronic device 201 may transmit the stereo audio packet SAU2 including the first audio data and the second audio data of the first time interval T1 to the first external electronic device 202 using the first communication link during the second time interval T2. For example, when a preset time has not elapsed after the detection of the disconnection of the second external electronic device 204, the electronic device 201 may transmit the stereo audio packet SAU2 including the first audio data and the second audio data of the first time interval T1 to the first external electronic device 202 within the second time interval T2. According to another embodiment, when the preset time has elapsed after the detection of the disconnection of the second external electronic device 204, the electronic device 201 may transmit the stereo audio packet SAU2 including the first audio data and the second audio data of the second time interval T2 to the first external electronic device 202 within the second time interval T2.

According to various embodiments, the electronic device 201 may transmit at least one stereo audio packet to the first external electronic device 202 during at least one time interval (e.g., including the second time interval T2) corresponding to the preset time. The electronic device 201 may receive ACK signals (e.g., ACK2 and ACK3) corresponding to the stereo audio packets (e.g., SAU2 and SAU3) of respective time intervals from the first external electronic device 202.

In an embodiment, the electronic device 201 may attempt to recover (e.g., reconnect) the second communication link with the second external electronic device 204 during the preset time. In an embodiment, the preset time may end when the electronic device 201 recovers the second communication link. In an embodiment, the preset time may be set to an estimated time required for the electronic device 201 to recover the second communication link.

According to various embodiments, the first external electronic device 202 may generate the second audio packet AU2-2 of the second time interval T2 based on the second audio data included in the stereo audio packet SAU2 and transmit the second audio packet AU2-2 of the second time interval T2 to the second external electronic device 204 using the third communication link. According to an embodiment, the first external electronic device 202 may transmit the second audio packet AU2-2 of the second time interval T2 to the second external electronic device 204 through the third communication link in a time interval (e.g., a sub-interval) that does not overlap with the time (sub-intervals) during which the electronic device 201 transmits first audio data and/or a stereo audio packet (SAU) to the first external electronic device 202. In an embodiment, the second external electronic device 204 may transmit the ACK signal ACK2-2 corresponding to the second audio packet AU2-2 of the second time period T2 to the first external electronic device 202 through the third communication link.

In an embodiment, when the second communication link with the second external electronic device 204 is recovered, the preset time may end. When the second communication link with the second external electronic device 204 is recovered, the electronic device 201 may transmit mono audio packets including first audio data and second audio data of a new time interval (e.g., T4) through the first communication link and the second communication link, respectively.

In an embodiment, when the first external electronic device 202 has received a stereo audio packet (e.g., SAU2 or SAU3) from the electronic device 201, and a given condition is satisfied, the first external electronic device 202 may determine to transmit a second audio packet (e.g., AU2-2 or AU2-3) including second audio data obtained from the stereo audio packet to the second external electronic device 204 through the third communication link. In an embodiment, the given condition may include identification of normal operation (e.g., good communication) of the third communication link, when the third communication has been established with the second external electronic device 204, and/or non-reception of a notification signal indicating abnormal operation of the second external electronic device 204 (e.g., disconnection of the second communication link or non-wearing of the second external electronic device 204) from the second external electronic device 204 or the electronic device 201.

In an embodiment, even if the first external electronic device 202 has received the stereo audio packet from the electronic device 201, when the given condition is not satisfied, for example, when the connection state of the third communication link with the second external electronic device 204 is not good or when a notification signal indicating disconnection or removal of the second external electronic device 204 has been received from the electronic device 201 or the second external electronic device 204, the first external electronic device 202 may not transmit the second audio data obtained from the stereo audio packet to the second external electronic device 204. In an embodiment, when the first external electronic device 202 does not transmit the second audio data to the second external electronic device 204, the first external electronic device 202 may perform the third operation for generating stereo audio by mixing the first audio data and the second audio data received from the electronic device 201 and outputting the stereo audio through the first speaker 274.

Referring to FIG. 13, the electronic device 201 may sequentially transmit a first audio packet and a second audio packet to the first external electronic device 202 during a preset time after identifying disconnection of the second communication link (1301).

According to various embodiments, compared to FIG. 12, the electronic device 201 may sequentially transmit a first audio packet AU1-2 including first audio data and a second audio packet AU2-2 including second audio data to the first electronic device 202 through the first communication link within the second time interval T2, without transmitting a stereo audio packet (SAU) to the first external electronic device 202, in response to the identification of the disconnection of the second communication link (1301). In an embodiment, the first external electronic device 202 may forward the second audio packet AU2-2 received from the electronic device 201 to the second external electronic device 204, using the third communication link. The first external electronic device 202 may transmit ACK signals ACK1-2 and ACK2-2 corresponding respectively to the first and second audio packets AU1-2 and AU2-2 of the second time interval T2 to the electronic device 201 through the first communication link.

In an embodiment, when the first external electronic device 202 has received the second audio packet (e.g., AU2-2 or AU2-3) together with the first audio packet (e.g., AU1-2 or AU1-3) from the electronic device 201, and a given condition is satisfied, the first external electronic device 202 may determine to transmit the second audio packet to the second external electronic device 204 through the third communication link. In an embodiment, the given condition may include detection of normal operation (e.g., good communication) of the third communication link, when the third communication link has been established with the second external electronic device 204 and/or non-reception of a notification signal indicating abnormal operation of the second external electronic device 204 (e.g., disconnection of the second communication link or non-wearing of the second external electronic device 204) from the second external electronic device 204 or the electronic device 201.

In an embodiment, even if the first external electronic device 202 has received the second audio packet from the electronic device 201, when the given condition is not satisfied, for example, when the communication state of the third communication link with the second external electronic device 204 is not good or when the notification signal indicating disconnection or non-wearing of the second external electronic device 204 has been received from the electronic device 201 or the second external electronic device 204, the first external electronic device 202 may not transmit the second audio packet to the second external electronic device 204. In an embodiment, when the first external electronic device 202 does not transmit the second audio packet to the second external electronic device 204, the first external electronic device 202 may perform the third operation for generating stereo audio by mixing the first audio data and the second audio data received from the electronic device 201 and outputting the stereo audio through the first speaker 274.

Although not shown, in an embodiment, the electronic device 201 may transmit second audio packets (e.g., AU2-2 and AU2-3) including second audio data to the second external electronic device 204 using the second communication link, while transmitting audio packets including first audio data and second audio data to the first external electronic device 202 through the first communication link, in order to identify the connection state of the second communication link. For example, upon receipt of a preset number of ACK signals corresponding to the second audio packets (e.g., AU2-2 and AU2-3) including the second audio data, the electronic device 201 may determine that the second communication link has been recovered.

Although not shown, in an embodiment, the electronic device 201 may receive information (e.g., worn) about a wearing state from the first external electronic device 202 or the second external electronic device 204, while transmitting the audio packets including the first audio data and the second audio data to the first external electronic device 202 through the first communication link, and determine to discontinue the transmission of the second audio data through the first communication link. In an embodiment, the electronic device 201 may resume the transmission of the second audio data through the second communication link. When needed, the electronic device 201 may establish the second communication link again.

Figure 14:
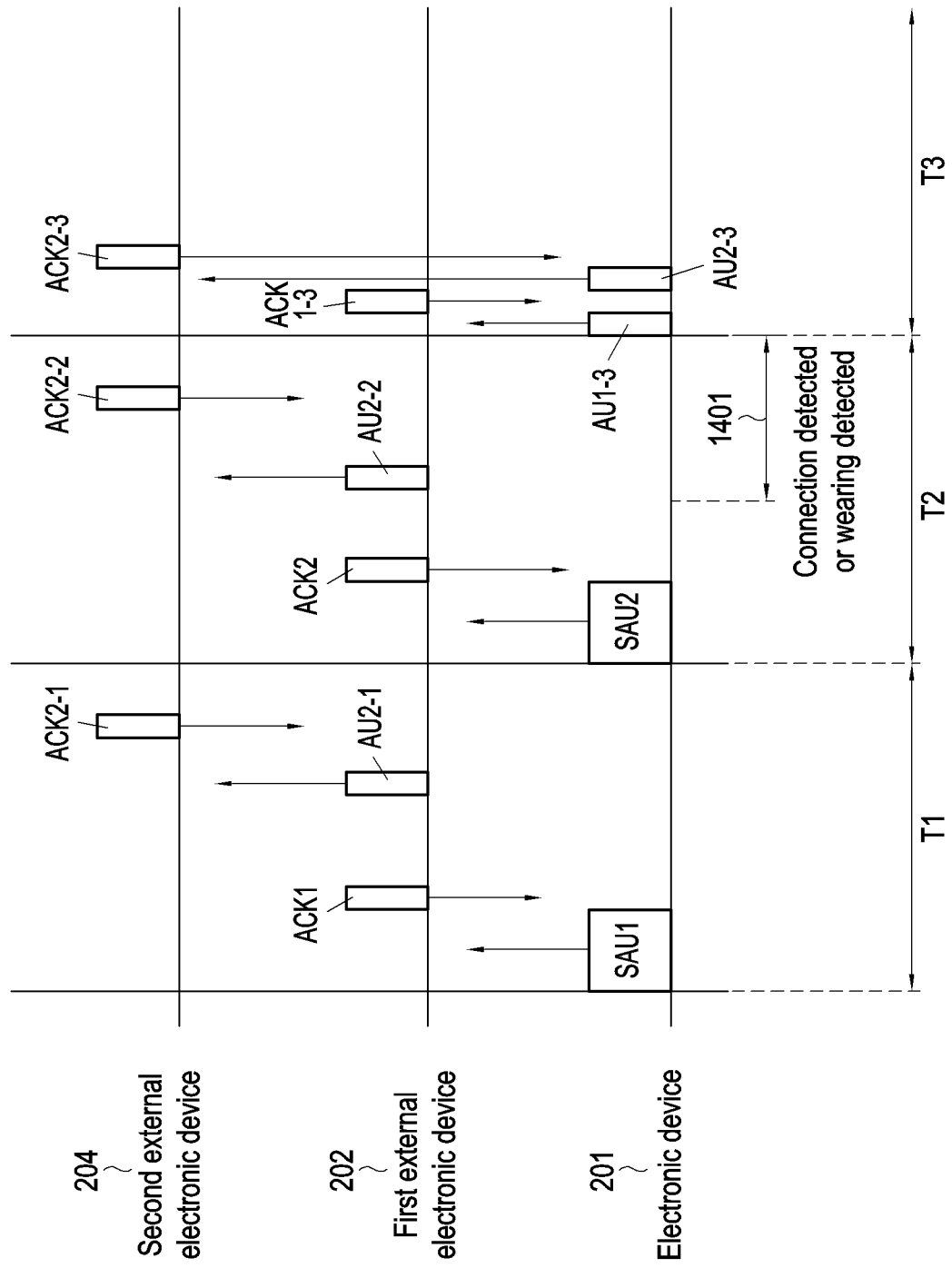
FIGS. 14 and 15 are diagrams illustrating an operation of transmitting audio data to a plurality of external electronic devices by an electronic device according to various example embodiments.
Figure 15:
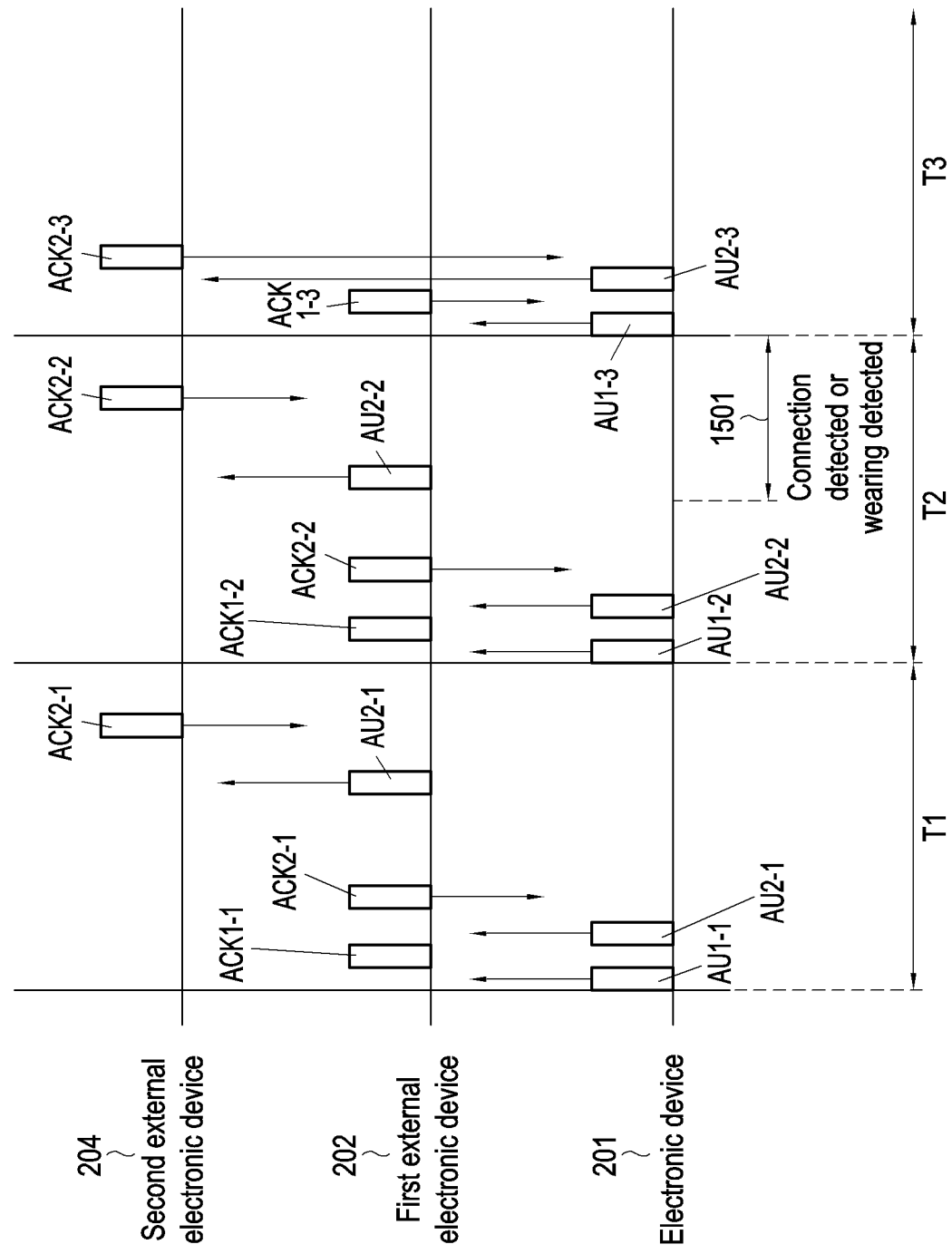

FIGS. 14 and 15 are diagrams illustrating an operation of transmitting audio data to a plurality of external electronic devices by an electronic device according to various embodiments.

Referring to FIG. 14, the electronic device 201 may transmit the stereo audio packet SAU1 to the first external electronic device 202 using the first communication link during the first time interval T1 based on identification of disconnection or non-wearing of the second external electronic device 204. For example, the stereo audio packet SAU1 may include first audio data and second audio data of the first time interval. The electronic device 201 may receive an ACK signal ACK1 corresponding to the stereo audio packet SAU1 from the first external electronic device 202 through the first communication link within the first time interval T1.

In an embodiment, the first external electronic device 202 may transmit the second audio packet AU2-1 including second audio data obtained from the stereo audio packet SAU1 to the second external electronic device 204 through the third communication link during the first time interval T1. In an embodiment, the first external electronic device 202 may perform the third operation for outputting the first audio data and the second audio data without transmitting the second audio packet AU2-1 to the second external electronic device 204 during the first time period T1.

Similarly, the electronic device 201 may transmit the stereo audio packet SAU2 to the first external electronic device 202 through the first communication link during the second time interval T2. In an embodiment, the first external electronic device 202 may transmit the second audio packet AU2-2 to the second external electronic device 204 through the third communication link. According to various embodiments, the first external electronic device 202 may obtain the second audio packet AU2-2 of the second time interval based on the second audio data included in the stereo audio packet SAU2 of the second time interval. The first external electronic device 202 may transmit the second audio packet AU2-2 of the second time period to the second external electronic device 204 using the third communication link. In an embodiment, during the second time interval T2, the first external electronic device 202 may perform the third operation for outputting the first audio data and the second audio data, without transmitting the second audio packet AU2-2 to the second external electronic device 204.

According to an embodiment, the electronic device 201 may detect connection or wearing of the second external electronic device 204 during the second time interval T2 or at least before the third time interval T3 (1401). In an embodiment, the electronic device 201 may detect that the second communication link with the second external electronic device 204 has been recovered or reconnected. In an embodiment, the electronic device 201 may receive information (e.g., worn) about a wearing state from the second external electronic device 204.

According to various embodiments, the electronic device 201 may transmit the first audio packet AU1-3 of a third time interval T3 to the first external electronic device 202 using the first communication link. The electronic device 201 may transmit the second audio packet AU2-3 of the third time period T3 to the second external electronic device 204 using the second communication link. That is, since the connection or wearing of the second external electronic device 204 has been detected, the electronic device 201 may discontinue the operation of transmitting stereo audio data to the first external electronic device 202 using the first communication link. In an embodiment, the electronic device 201 may receive an ACK signal ACK1-3 corresponding to the first audio packet AU1-3 of the third time interval T3 from the first external electronic device 202 using the first communication link. The electronic device 201 may receive an ACK signal ACK2-3 corresponding to the second audio packet AU2-3 of the third time interval T3 from the second external electronic device 204 using the second communication link.

Referring to FIG. 15, based on identification of disconnection or non-wearing of the second external electronic device 204, the electronic device 201 may transmit both a first audio packet AU1-1 and a second audio packet AU2-1 to the first electronic device 202 using the first communication link during a first time interval T1. For example, the first audio packet AU1-1 and the second audio packet AU2-1 may include first audio data and second audio data of the first time interval, respectively. Within the first time period T1, the electronic device 201 may transmits receive ACK signals ACK1-1 and ACK2-1 corresponding to the first audio packet AU1-1 and the second audio packet AU2-1 from the first external electronic device 202 through the first communication link.

In an embodiment, the first external electronic device 202 may forward the second audio packet AU2-1 to the second external electronic device 204 through the third communication link during the first time interval T1. In an embodiment, during the first time period T1, the first external electronic device 202 may perform a third operation for outputting the first audio data and the second audio data does not transmit the second audio packet AU2-1 to the second external electronic device 204 without transmitting the second audio packet AU2-1 to the second electronic device 204.

Similarly, during the second time interval T2, the electronic device 201 may transmit a first audio packet AU1-2 and a second audio packet AU2-2 to the first external electronic device 202 through the first communication link. In an embodiment, the first external electronic device 202 may forward the second audio packet AU2-2 to the second external electronic device 204 through the third communication link. In an embodiment, during the second time period T2, the first external electronic device 202 may perform a third operation for outputting the first audio data and the second audio data without transmitting the second audio packet AU2-2 to the second external electronic device 204.

According to an embodiment, the electronic device 201 may detect connection or wearing of the second external electronic device 204 during the second time period T2 or at least before the third time period T3 (1501). In an embodiment, the electronic device 201 may detect that the second communication link with the second external electronic device 204 has been recovered or reconnected. In an embodiment, the electronic device 201 may receive information (e.g., worn) about a wearing state from the second external electronic device 204.

According to various embodiments, the electronic device 201 may transmit a first audio packet AU1-3 of a third time interval T3 to the first external electronic device 202 using the first communication link. The electronic device 201 may transmit a second audio packet AU2-3 of the third time period T3 to the second external electronic device 204 using the second communication link. That is, since the connection or wearing of the second external electronic device 204 has been detected, the electronic device 201 may discontinue the operation of transmitting the second audio data to the first external electronic device 202 using the first communication link. In an embodiment, the electronic device 201 may receive the ACK signal ACK1-3 corresponding to the first audio packet AU1-3 of the third time interval T3 from the first external electronic device 202 using the first communication link. The electronic device 201 may receive the ACK signal ACK2-3 corresponding to the second audio packet AU2-3 of the third time interval T3 from the second external electronic device 204 using the second communication link.

In various embodiments, the electronic device 201 may perform the operations of FIGS. 12 and 14 or the operations of FIGS. 13 and 15 to switch the first communication link with the first external electronic device 202 or the second communication link with the second external electronic device 204 to another communication scheme. In an embodiment, the electronic device 201 may perform the operations of FIGS. 12 and 14 or the operations of FIGS. 13 and 15 to switch a Bluetooth-based second communication link to a Wi-Fi communication link supporting a higher data throughput. While the second communication link of the Bluetooth scheme is switched to the communication link of the Wi-Fi scheme, the first external electronic device 202 may receive first audio data and second audio data from the electronic device 201 and output stereo audio.

An electronic device (e.g., the electronic device 201) according to various embodiments may include a communication module (e.g., the communication module 240) supporting wireless communication and a processor (e.g., the processor 220, which of course include at least one processing circuitry). The processor may be configured to establish a first communication link with a first external electronic device (e.g., the first external electronic device 202) and establish a second communication link with a second external electronic device (e.g., the second external electronic device 204), through the communication module, obtain first audio data and second audio data based on a command to output stereo audio, transmit the first audio data to the first external electronic device using the first communication link, transmit the second audio data to the second external electronic device using the second communication link, and transmit the first audio data and the second audio data to the first external electronic device using the first communication link in response to identification of at least one of communication deterioration, disconnection, or removal from a user of the second external electronic device, to allow the first external electronic device to transmit the second audio data to the second external electronic device.

The first audio data may include first mono audio data corresponding to a first channel, and the second audio data may include second mono audio data corresponding to a second channel, among stereo audio data.

The processor may be configured to transmit at least one audio packet including the second audio data to the second external electronic device using the second communication link, while transmitting the first audio data and the second audio data using the first communication link in response to the identification of communication deterioration of the second communication link.

The processor may be configured to, upon receipt of at least one ACK signal for the at least one audio packet from the second external electronic device, identify that the second communication link is in a normal state.

The processor may be configured to transmit the first audio data without the second audio data using the first communication link in response to the identification that the second communication link is in the normal state.

The processor may be configured to transmit at least one stereo audio packet including the first audio data and the second audio data or sequentially transmit at least one first audio packet including the first audio data and at least one second audio packet including the second audio data, in response to the identification of the at least one of communication deterioration, disconnection, or removal of the second external electronic device.

The processor may be configured to receive first information about a wearing state of the second external electronic device from the first external electronic device or the second external electronic device, and identify removal of the second external electronic device based on the first information about the wearing state.

The processor may be configured to receive second information about the wearing state of the second external electronic device from the first external electronic device or the second external electronic device, and transmit the first audio data without the second audio data using the first communication link, in response to identification of wearing of the second external electronic device based on the second information about the wearing state.

The processor may be configured to transmit the first audio data and the second audio data based on a second audio packet of a first time interval not received by the second external electronic device due to communication deterioration of the second communication link.

The processor may be configured to, when a specified time elapses after the second external electronic device fails to receive a second audio packet of a first time interval due to communication deterioration of the second communication link, transmit a first audio packet of a second time interval and a second audio packet of the second time interval to the first external electronic device.

Each of the first communication link and the second communication link may include a BLE communication link or a Wi-Fi link.

The first external electronic device may include an earphone of the first channel, and the second external electronic device may include an earphone of the second channel.

A method of operating an electronic device (e.g., the electronic device 201) according to various embodiments may include establishing a first communication link with a first external electronic device (e.g., the first external electronic device 202), establishing a second communication link with a second external electronic device (e.g., the second external electronic device 204), obtaining first audio data and second audio data based on a command to output stereo audio, transmitting the first audio data to the first external electronic device using the first communication link, transmitting the second audio data to the second external electronic device using the second communication link, and transmitting the first audio data and the second audio data to the first external electronic device using the first communication link in response to identification of at least one of communication deterioration, disconnection, or removal from a user of the second external electronic device, to allow the first external electronic device to transmit the second audio data to the second external electronic device.

The first audio data may include first mono audio data corresponding to a first channel, and the second audio data may include second mono audio data corresponding to a second channel, among stereo audio data.

The method may further include transmitting at least one audio packet including the second audio data to the second external electronic device using the second communication link to identify a connection state of the second communication link, while transmitting the first audio data and the second audio data using the first communication link in response to the identification of communication deterioration of the second communication link.

The method may further include, upon receipt of at least one ACK signal for the at least one audio packet from the second external electronic device, identifying that the second communication link is in a normal state.

The method may further include transmitting the first audio data without the second audio data using the first communication link in response to the identification that the second communication link is in the normal state.

Transmitting the first audio data and the second audio data using the first communication link may include transmitting at least one stereo audio packet including the first audio data and the second audio data or sequentially transmitting at least one first audio packet including the first audio data and at least one second audio packet including the second audio data.

The method may further include: receiving first information about a wearing state of the second external electronic device from the first external electronic device or the second external electronic device; and identifying removal of the second external electronic device based on the first information about the wearing state.

The method may further include: receiving second information about the wearing state of the second external electronic device from the first external electronic device or the second external electronic device; and transmitting the first audio data without the second audio data using the first communication link, in response to identification of wearing of the second external electronic device based on the second information about the wearing state. "Based on" as used herein covers based at least on.

Each of the first communication link and the second communication link may include a BLE communication link or a Wi-Fi link.

A first external electronic device (e.g., the first external electronic device 202) according to various embodiments may include a speaker (e.g., the first speaker 274), a communication module (e.g., the first communication module 272, comprising at least one communication circuitry) supporting wireless communication, and a processor (e.g., the first processor 270). The processor may be configured to establish a first communication link with an electronic device (e.g., the electronic device 201) and establish a second communication link with a second external electronic device (e.g., the second external electronic device 204) through the communication module, receive first audio data using the first communication link, perform a first operation for outputting the first audio data through the speaker, and when the first audio data and second audio data related to the second external electronic device are received using the first communication link, and a given condition is satisfied, perform the first operation for the first audio data and transmit at least one second audio packet including the second audio data to the second external electronic device using the second communication link.

According to an embodiment, the given condition may include at least one of a good connection state of the second communication link, when the second communication link is established, or non-notification of non-wearing of the second external electronic device.

According to an embodiment, the processor may be configured to, when the first audio data and the second audio data are received using the first communication link, and the given condition is not satisfied, perform a second operation for outputting stereo data including the first audio data and the second audio data through the speaker.

The processor may be configured to, upon occurrence of communication deterioration of the first communication link, disconnection of the first communication link, or removal of the first external electronic device from a user, receive at least one first audio packet including the first audio data from the second external electronic device, using the second communication link.

The first external electronic device may be implemented as an earphone of the first channel, and the second external electronic device may be implemented as an earphone of the second channel.

Each of the afore-mentioned components of the electronic device may include one or more components, and the name of the corresponding component may vary depending on the type of the electronic device. In various embodiments, the electronic device may include at least one of the above-described components, and some components may be omitted or additional components may be further included. In addition, some of the components of the electronic device according to various embodiments may be combined to form a single entity, so that the functions of the corresponding components before the combining may be performed.

The embodiments of the disclosure are presented for a description and understanding of the technical idea, not limiting the scope of the disclosure. Therefore, the scope of the disclosure should be interpreted as encompassing all changes or various embodiments based on the technical spirit of the disclosure.

While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. An electronic device comprising:
a communication module, comprising at least one communication circuitry, configured to support wireless communication;
memory storing instructions; and
at least one processor,
wherein the instructions, when executed by the at least one processor individually or collectively, cause the electronic device to:
establish a first communication link with a first external electronic device and establish a second communication link with a second external electronic device, via at least the communication module,
obtain first audio data and second audio data based on a command to output stereo audio,
transmit the first audio data to the first external electronic device via the first communication link, and control to transmit the second audio data to the second external electronic device via the second communication link,
transmit the first audio data and the second audio data to the first external electronic device via the first communication link in response to identification of at least one of communication deterioration, disconnection, or removal from a user of the second external electronic device, so as to allow the first external electronic device to transmit the second audio data to the second external electronic device,
based on a receipt of at least one ACK signal for the at least one audio packet from the second external electronic device while transmitting the first audio data and the second audio data via the first communication link, identify that the second communication link is in a normal state, and
transmit the first audio data without the second audio data via the first communication link, based on the identification that the second communication link is in the normal state.

2. The electronic device of claim 1, wherein the first audio data comprises first mono audio data corresponding to a first channel, and the second audio data comprises second mono audio data corresponding to a second channel, among stereo audio data.

3. The electronic device of claim 1, wherein the instructions, when executed by the at least one processor individually or collectively, cause the electronic device to transmit at least one audio packet including the second audio data to the second external electronic device via the second communication link, while transmitting the first audio data and the second audio data via the first communication link in response to the identification of communication deterioration of the second communication link.

4. The electronic device of claim 1, wherein the instructions, when executed by the at least one processor individually or collectively, cause the electronic device to transmit at least one stereo audio packet including the first audio data and the second audio data and/or sequentially transmit at least one first audio packet including the first audio data and at least one second audio packet including the second audio data, in response to the identification of the at least one of communication deterioration, disconnection, or removal of the second external electronic device.

5. The electronic device of claim 1, wherein the instructions, when executed by the at least one processor individually or collectively, cause the electronic device to:
receive first information about a wearing state of the second external electronic device from the first external electronic device and/or the second external electronic device, and
identify removal of the second external electronic device based on the first information about the wearing state.

6. The electronic device of claim 5, wherein the instructions, when executed by the at least one processor individually or collectively, cause the electronic device to:
receive second information about the wearing state of the second external electronic device from the first external electronic device and/or the second external electronic device, and
transmit the first audio data without the second audio data via the first communication link, in response to identification of wearing of the second external electronic device based on the second information about the wearing state.

7. The electronic device of claim 1, wherein the instructions, when executed by the at least one processor individually or collectively, cause the electronic device to transmit the first audio data and the second audio data based on a second audio packet of a first time interval not received by the second external electronic device due to communication deterioration of the second communication link.

8. The electronic device of claim 1, wherein the instructions, when executed by the at least one processor individually or collectively, cause the electronic device to, when a specified time elapses after the second external electronic device fails to receive a second audio packet of a first time interval due to communication deterioration of the second communication link, control to transmit a first audio packet of a second time interval and a second audio packet of the second time interval to the first external electronic device.

9. The electronic device of claim 1, wherein at least one of the first communication link or the second communication link comprises a BLE communication link or a Wi-Fi link.

10. A method of operating an electronic device, comprising:
establishing a first communication link with a first external electronic device, and establishing a second communication link with a second external electronic device;
obtaining first audio data and second audio data based on a command to output stereo audio;
transmitting the first audio data to the first external electronic device using the first communication link, and transmitting the second audio data to the second external electronic device using the second communication link;
transmitting the first audio data and the second audio data to the first external electronic device using the first communication link in response to identification of at least one of communication deterioration, disconnection, or removal from a user of the second external electronic device;
based on a receipt of at least one ACK signal for the at least one audio packet from the second external electronic device while transmitting the first audio data and the second audio data via the first communication link, identifying that the second communication link is in a normal state; and
transmitting the first audio data without the second audio data via the first communication link, based on the identification that the second communication link is in the normal state.

11. The method of claim 10, wherein the first audio data may include first mono audio data corresponding to a first channel, and the second audio data may include second mono audio data corresponding to a second channel, among stereo audio data.

12. The method of claim 10, further comprising transmitting at least one audio packet including the second audio data to the second external electronic device using the second communication link to identify a connection state of the second communication link, while transmitting the first audio data and the second audio data using the first communication link in response to the identification of communication deterioration of the second communication link.

13. The method of claim 10, wherein transmitting the first audio data and the second audio data using the first communication link comprises transmitting at least one stereo audio packet including the first audio data and the second audio data and/or sequentially transmitting at least one first audio packet including the first audio data and at least one second audio packet including the second audio data.

14. The method of claim 10, further comprising:
receiving first information about a wearing state of the second external electronic device from the first external electronic device and/or the second external electronic device; and
identifying removal of the second external electronic device based on the first information about the wearing state.

15. The method of claim 14, further comprising:
receiving second information about the wearing state of the second external electronic device from the first external electronic device and/or the second external electronic device; and
transmitting the first audio data without the second audio data using the first communication link, in response to identification of wearing of the second external electronic device based on the second information about the wearing state.

16. A first electronic device comprising:
a speaker;
a communication module, comprising at least one communication circuitry, configured to support wireless communication;
memory storing instructions; and
at least one processor,
wherein the instructions, when executed by the at least one processor individually or collectively, cause the first electronic device to:
establish a first communication link with an external electronic device via at least the communication module,
receive first audio data via the first communication link, and perform a first operation for outputting the first audio data via the speaker, and
perform the first operation for the first audio data and control to transmit at least one second audio packet including second audio data to a second electronic device via a second communication link, based on the first audio data and the second audio data related to the second electronic device being received via the first communication link and a given condition being satisfied,
based on the first audio data and the second audio data are received using the first communication link, and the given condition is not satisfied, perform a second operation for outputting stereo data including the first audio data and the second audio data via the speaker.

17. The first electronic device of claim 16, wherein the given condition includes at least one of a good connection state of the second communication link, when the second communication link is established, or non-notification of non-wearing of the second electronic device.

* * * * *